United States Patent
Sakamoto et al.

(10) Patent No.: US 8,187,689 B2
(45) Date of Patent: May 29, 2012

(54) OPTICAL RECORDING MEDIUM HAVING WRITE ONCE METAL REFLECTIVE FILM

(75) Inventors: Tetsuhiro Sakamoto, Tokyo (JP); Jun Nakano, Tokyo (JP); Naoki Okawa, Tokyo (JP); Junichi Nakai, Hyogo (JP); Yuki Tauchi, Hyogo (JP)

(73) Assignees: Sony Corporation, Tokyo (JP); Kabushiki Kaisha Kobe Seiko Sho, Hyogo (JP)

( * ) Notice: Subject to any disclaimer, the term of this patent is extended or adjusted under 35 U.S.C. 154(b) by 517 days.

(21) Appl. No.: 12/303,408

(22) PCT Filed: Jun. 15, 2007

(86) PCT No.: PCT/JP2007/062165
§ 371 (c)(1),
(2), (4) Date: Dec. 4, 2008

(87) PCT Pub. No.: WO2007/145336
PCT Pub. Date: Dec. 21, 2007

(65) Prior Publication Data
US 2009/0252914 A1    Oct. 8, 2009

(30) Foreign Application Priority Data
Jun. 15, 2006    (JP) .................................. 2006-166311

(51) Int. Cl.
*B32B 3/02*    (2006.01)
(52) U.S. Cl. .................. 428/64.1; 428/64.4; 430/270.12
(58) Field of Classification Search .................. 428/64.4
See application file for complete search history.

(56) References Cited

U.S. PATENT DOCUMENTS

| | | | |
|---|---|---|---|
| 6,414,913 B1 | 7/2002 | Kobayashi et al. | |
| 6,788,635 B1 | 9/2004 | Aratani et al. | |
| 6,841,219 B2 * | 1/2005 | Nee | 428/64.1 |
| 6,852,384 B2 * | 2/2005 | Nee | 428/64.1 |
| 6,905,750 B2 * | 6/2005 | Nee | 428/64.1 |
| 6,985,429 B2 * | 1/2006 | Aratani et al. | 369/288 |

FOREIGN PATENT DOCUMENTS

CN    1321306    11/2001
(Continued)

OTHER PUBLICATIONS

European Search Report mailed Oct. 4, 2010 corresponding to European Patent Appln. No. 07745419.7.

*Primary Examiner* — Elizabeth Mulvaney
(74) *Attorney, Agent, or Firm* — K&L Gates LLP

(57) ABSTRACT

A pirated optical recording medium may be determined which is produced by physically transferring a shape of pits and lands formed on a substrate of an optical recording medium. The optical recording medium is provided with excellent weatherability and long-term storage reliability. A reflective film formed of an Ag alloy film of $Ag_{100-x-y}X_xCu_y$, where X is at least one element among Ti, W, Ta, V, Mo, Nb and Zr, is formed on a substrate on which main data is recorded with a combination of pits and lands. A mark may be formed so that a reproduction signal level in the recorded mark of auxiliary data write once recorded on the reflective film is increased, and a reproduction signal level is decreased in an optical recording medium prepared by physically transferring the surface shape of the pits and lands of the substrate. A pirated optical recording medium may be determined in this manner.

6 Claims, 25 Drawing Sheets

FOREIGN PATENT DOCUMENTS

| | | | |
|---|---|---|---|
| EP | 1122723 | 8/2001 | |
| JP | 11-191218 | 7/1999 | |
| JP | 2000-228032 | * | 8/2000 |
| JP | 2005-050497 | 2/2005 | |
| TW | 472253 | 1/2002 | |
| WO | 01/08145 | 2/2001 | |

* cited by examiner

FIG. 17
TABLE 1

| | | 410 nm | 670 nm | 790 nm |
|---|---|---|---|---|
| EXAMPLE 5 (Ag-6.8Ti) | NOT HEATED | 58.41% | 76.74% | 79.50% |
| | HEATED | 59.19% | 78.77% | 81.55% |
| EXAMPLE 6 (Ag-10Ta) | NOT HEATED | 49.58% | 67.13% | 69.12% |
| | HEATED | 52.12% | 69.19% | 71.64% |

*FIG. 32*

| ADDRESS | RECORDED MAIN DATA |
|---|---|
| 000001 | 00011···11 |
| 000002 | 11000···00 |
| 000003 | 00111···11 |
| ⋮ | ⋮ |

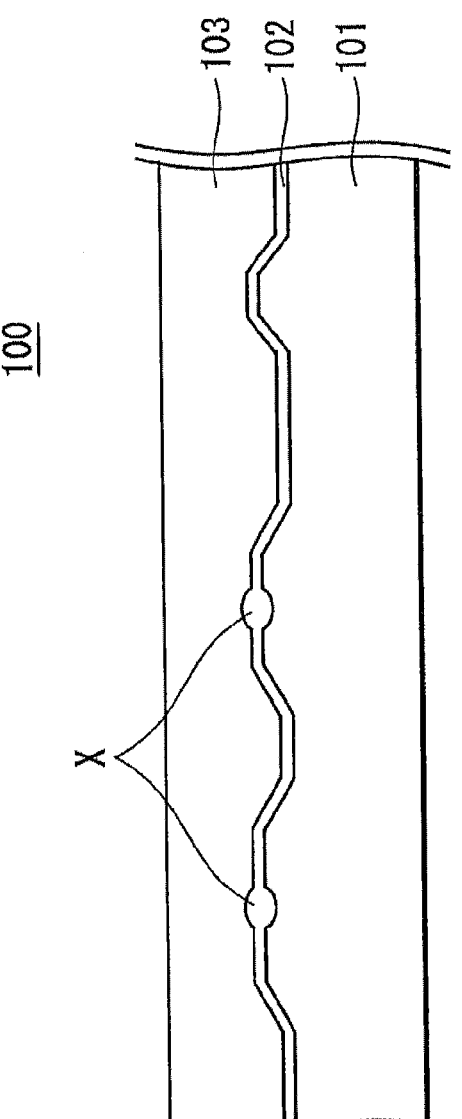
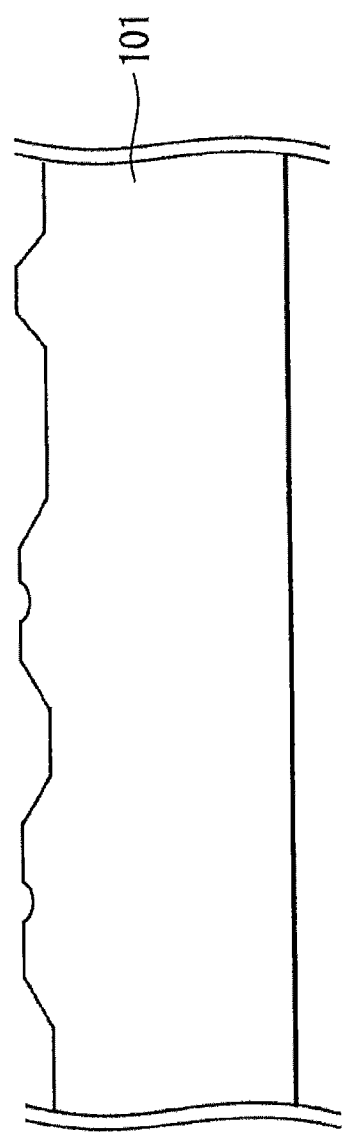
FIG. 33A
FIG. 33B

OPTICAL RECORDING MEDIUM HAVING WRITE ONCE METAL REFLECTIVE FILM

CROSS REFERENCE TO RELATED APPLICATIONS

The present application claims priority to Japanese Patent Application No. 2006-166311 filed on Jun. 15, 2006, the entire contents of which are being incorporated herein by reference.

BACKGROUND

Optical disks as optical recording media, particularly read-only ROM (Read Only Memory) disks, are widely used around the world as package media, because a large number of replica substrates may be manufactured in a short time at low cost from one stamper by plastic injection molding.

For example, CDs (Compact Discs) and DVDs (Digital Versatile Discs) are commonly used as ROM disks for recording data such as music and images.

Conventionally, duplicated disks called pirated disks have been prepared by illegally copying recorded data of ROM disks sold as package media, and violation of copyrights is a problem.

Pirated disks are generally manufactured as duplicated disks from a stamper prepared by a mastering process based on a signal reproduced from a normal disk.

Alternatively, pirated disks are manufactured by copying a signal reproduced from a normal disk to a recordable disk.

Various methods have been proposed and studied to prevent the manufacture of pirated disks.

As one of the methods, there is known a method of adding different identifications to individual disks, for example. Using the method of adding different identifications to individual disks makes it possible to build a system in which a reproduction device reads an identification of a disk and transmits it to an external server through a network. The presence of pirated disks may be detected using such a system, because a large number of identical identifications are detected by the server when pirated disks are prepared and sold, for example. Further, pirated disk manufacturers may be specified by specifying a reproduction device having transmitted the detected identification.

However, even in the case where unique identifications are added to individual disks as described above, recording by a method preventing easy reproduction and copying using a commercially available drive is useful for protecting copyrights.

Accordingly, a recording method has been proposed in which a mark of the aforementioned identification is formed on a reflective film of a disk to provide a slight change in reflectance (see Japanese Patent No. 3454410, for example).

In the disk described in Japanese Patent No. 3454410, main data (data such as content data or management information) is recorded with a combination of pits and lands, and auxiliary data (identification) other than the main data is recorded by forming a mark providing a slight change in reflectance on a reflective film on a predetermined pit or land.

The aforementioned recording of a mark on the reflective film is performed by laser irradiation using recording power higher than reproduction laser power. Here, a change in reflectance due to the mark is so slight that there is no influence on reproduction of main data recorded with a combination of pits and lands. Specifically, auxiliary data is prevented from being reproduced in normal reproduction of the main data.

The auxiliary data itself is reproduced by providing a separate reproduction system, sampling many parts provided with such a slight change in reflectance in a reproduction signal of the main data, and determining an integrated value of these, for example.

In this case, a position on which a mark as auxiliary data should be formed is determined by a predetermined algorithm in an auxiliary data recording device and a reproduction device. Therefore, a normal reproduction device may appropriately reproduce an identification as auxiliary data, because a position on which a mark should be recorded may be specified by the same algorithm as used in recording.

Pirated disks are assumed to be prepared using a reproduction signal of a normal ROM disk. Another method is possible where a stamper is prepared by directly transferring a physical shape of a substrate of a ROM disk.

Specifically, in the method, a cover layer and a reflective film of a normal disk are separated from a substrate to expose a shape of pits and lands formed on the substrate, and the exposed irregular shape is physically transferred to duplicate a content recorded on the disk.

In the aforementioned disk described in Japanese Patent No. 3454410, an identification of an individual disk is recorded with a mark formed on a reflective film. According to this, a mark (identification) formed on a reflective film may not be transferred by the aforementioned physical transfer method in which it is necessary to separate a cover layer and a reflective film from a substrate. Therefore, it is assumed that the manufacture of pirated disks may be prevented.

However, a mark is actually recorded on a reflective film by irradiation with a relatively high power laser. Therefore, deformation corresponding to the mark on a substrate itself such as local thermal expansion may occur on the disk substrate due to heating of the recorded part when the intended mark is recorded.

In other words, a mark that should be formed only on a reflective film may also be physically transferred to a substrate, and auxiliary data may be duplicated together with main data by the physical transfer to the substrate.

This transfer will be described with reference to the following FIG. 33.

FIG. 33A shows a cross-sectional structure of an optical disk 100 having a mark formed on a reflective film as described above.

The optical disk 100 includes a reflective film 102 and a cover layer 103 formed on a substrate 101. An irregular cross-sectional shape formed between the substrate 101 and the reflective film 102 is a part on which main data is recorded with a combination of pits and lands.

As described above, a mark as auxiliary data as indicated by a symbol X is recorded on a reflective film on a predetermined pit or land. The figure shows an example where the mark X is recorded on the reflective film 102 on a predetermined land.

In the present specification, a land refers to a part optically close to a source of light incident on an irregular surface on an optical recording medium such as an optical disk, that is, a part having a shape projected to a light incidence side.

In this case, as described above, when a mark as auxiliary data is recorded, the reflective film 102 is irradiated with a relatively high power laser, and deformation due to thermal expansion or the like with the increase in temperature may occur in a place X on which the mark is formed.

A recessed dent is transferred to a surface of the substrate 101 in contact with the reflective film 102 by this deformation. Specifically, when the substrate 101 is exposed by separating the cover layer 103 and the reflective film 102 in this case, a recessed shape corresponding to a mark that should be formed only on the reflective film 102 is transferred to a surface of the substrate 101 as shown in FIG. 33B.

The recessed part transferred in this manner has a reflectance slightly decreased from that of another land. In other words, a mark as auxiliary data is directly reproduced in a replica (replicated) substrate prepared by directly transferring such a recessed shape of the substrate 101.

When a reflective film and a cover layer are stacked on such a replica substrate in the same manner as in a typical manufacturing process, a pirated disk may be manufactured in which main data and auxiliary data recorded on a normal disk are entirely copied.

In Japanese Patent Application No. 2005-205439 (an application claiming priority based on Japanese Patent Application No. 2005-30272), the present applicant has previously proposed a reproduction device, a reproduction method, a recording device, a recording method, a method of manufacturing an optical disk, and an optical disk recording medium, where reproduction in a manner such as polarity inversion different from that of a normal copy is performed on a so-called pirated optical recording medium prepared by illegal duplication even when auxiliary data for duplication prevention or detection is physically transferred as described above.

SUMMARY

The present disclosure relates to an optical recording medium having a write once metal reflective film, in particular, an optical recording medium having a write once metal reflective film with which an illegally duplicated copy may be effectively determined or excluded.

In an embodiment, an optical recording medium is provided having a write once metal reflective film, where a pirated copy may be detected, reproduction of the pirated copy may be refused, and characteristics of the pirated copy may greatly deteriorate, as a result of further extensive studies based on the above-described proposal so that transferred auxiliary data more surely exhibits properties differing from those of auxiliary data in a normal copy.

In an embodiment, an optical recording medium is provided having a write once metal reflective film, where long-term storage reliability of the above optical recording medium is increased by greatly improving weatherability of its reflective film.

The optical recording medium having a write once metal reflective film according to the embodiment includes at least a write once metal reflective film and a cover layer stacked and formed on a substrate. Main data is recorded on the substrate with a combination of pits and lands, the write once metal reflective film allows write once recording by thermal recording with irradiation of laser light, auxiliary data is recorded with a mark formed by irradiating the write once metal reflective film with write once recording laser light, a reproduction signal level in a part on which the mark is formed is increased for the lands having a predetermined length, and the mark is formed in an optical disk recording medium prepared by physically transferring a surface shape of the pits and lands of the substrate, so that a reproduction signal level in a part on which the mark is formed is decreased. The optical recording medium is characterized in that the write once metal reflective film is formed of an Ag alloy film of $Ag_{100-x-y}X_xCu_y$ (x, y: at %), the X is at least one element among elements of Ti, W, Ta, V, Mo, Nb and Zr, and a composition y of Cu in the Ag alloy film is selected to be $2 \leq y \leq 13$ [at %].

It has been verified as described later that a reproduction signal level is increased in a part on which a recorded auxiliary data mark is formed in the optical recording medium having such a configuration, and a reproduction signal level is decreased in a part on which the mark is formed in an optical recording medium prepared by physically transferring a substrate shape of the above optical recording medium.

The optical recording medium having a write once metal reflective film according to the embodiment having the aforementioned configuration is characterized in that the write once metal reflective film is formed of the Ag alloy film of $Ag_{100-x-y}X_xCu_y$, the X is Ti, a composition x of Ti in the Ag alloy film is selected to be $4.5 \leq x \leq 17$ [at %], and a composition y of Cu in the Ag alloy film is selected to be $2 \leq y \leq 13$ [at %].

The optical recording medium having a write once metal reflective film according to the embodiment having the aforementioned configuration is characterized in that the write once metal reflective film is formed of the Ag alloy film of $Ag_{100-x-y}X_xCu_y$, the X is W, a composition x of W in the Ag alloy film is selected to be $2.5 \leq x \leq 11$ [at %], and a composition y of Cu in the Ag alloy film is selected to be $2 \leq y \leq 13$ [at %].

The optical recording medium having a write once metal reflective film according to the embodiment having the aforementioned configuration is characterized in that the write once metal reflective film is formed of the Ag alloy film of $Ag_{100-x-y}X_xCu_y$, the X is Ta, a composition x of Ta in the Ag alloy film is selected to be $0.61 \leq x \leq 10.5$ [at %], and a composition y of Cu in the Ag alloy film is selected to be $2 \leq y \leq 13$ [at %].

The optical recording medium having a write once metal reflective film according to the embodiment having the aforementioned configuration is characterized in that the write once metal reflective film is formed of the Ag alloy film of $Ag_{100-x-y}X_xCu_y$, the X is at least two elements among Ti, W, Ta, V, Mo, Nb and Zr, a total composition x of X in the Ag alloy film is selected to be $0.6 \leq x \leq 17$ [at %], and a composition y of Cu in the Ag alloy film is selected to be $2 \leq y \leq 13$ [at %].

It has been verified that auxiliary data in a normal optical recording medium and auxiliary data in a pirated optical recording medium may be surely reverse in polarity to each other as a result of specifying an element X in the Ag alloy of the aforementioned write once metal reflective film having an Ag alloy composition of $Ag_{100-x-y}X_xCu_y$ containing Cu and specifying its composition ratio.

A reproduction signal level is increased in the aforementioned normal copy according to the embodiment and a reproduction signal level is decreased in an illegally duplicated copy called a pirated copy, when a mark is recorded on a land.

In an embodiment, an "optical recording medium prepared by physically transferring a shape of a substrate" refers to an optical recording medium prepared by depositing a reflective film on a replica substrate prepared based on a stamper prepared by physically transferring a shape of a substrate, or an optical recording medium prepared by depositing a reflective film again on a substrate from which a reflective film has been separated.

According to the optical recording medium having a write once metal reflective film according to the embodiment, a mark for a normal copy may be formed as recorded auxiliary data on a write once metal reflective film, and an optical recording medium may be formed so that a reproduction signal level is increased in a part on which the mark is formed in the normal copy and a reproduction signal level is decreased in a part on which the mark is formed in a pirated copy. This makes it possible to form an optical recording medium in which a value of auxiliary data reproduced in a normal copy and a value of auxiliary data reproduced in a pirated copy are reverse in polarity to each other. Therefore, a pirated copy may be determined.

According to the optical recording medium having a write once metal reflective film according to the embodiment, weatherability of a reflective film used for reproducing main data and recording and reproducing auxiliary data may be improved, so that long-term storage reliability of an optical recording medium is improved.

According to the optical recording medium having a write once metal reflective film according to the embodiment, a part of Ag is replaced by Cu in the Ag alloy reflective film. When the Ag is replaced by Cu at 2 to 13 at %, a reflectance is not decreased despite the replacement with Cu and durability may be improved.

Additional features and advantages are described herein, and will be apparent from, the following Detailed Description and the figures.

BRIEF DESCRIPTION OF THE FIGURES

FIG. 17 is a table which illustrates basic compositions of an AgTi alloy reflective film and an AgTa alloy reflective film which are write once metal reflective films, and shows results of measuring their reflectances (Table 1).

FIG. 32 is a structural view of data stored in a reproduction device.

FIG. 33A is a cross-sectional view of an optical recording medium in a state where data is recorded on a reflective film, and FIG. 33B is a cross-sectional view showing deformation of its substrate.

DETAILED DESCRIPTION

Embodiments of the optical recording medium having a write once metal reflective film will be illustratively described. However, the optical recording medium having a write once metal reflective film according to the embodiments are not limited thereto.

Figure 1:
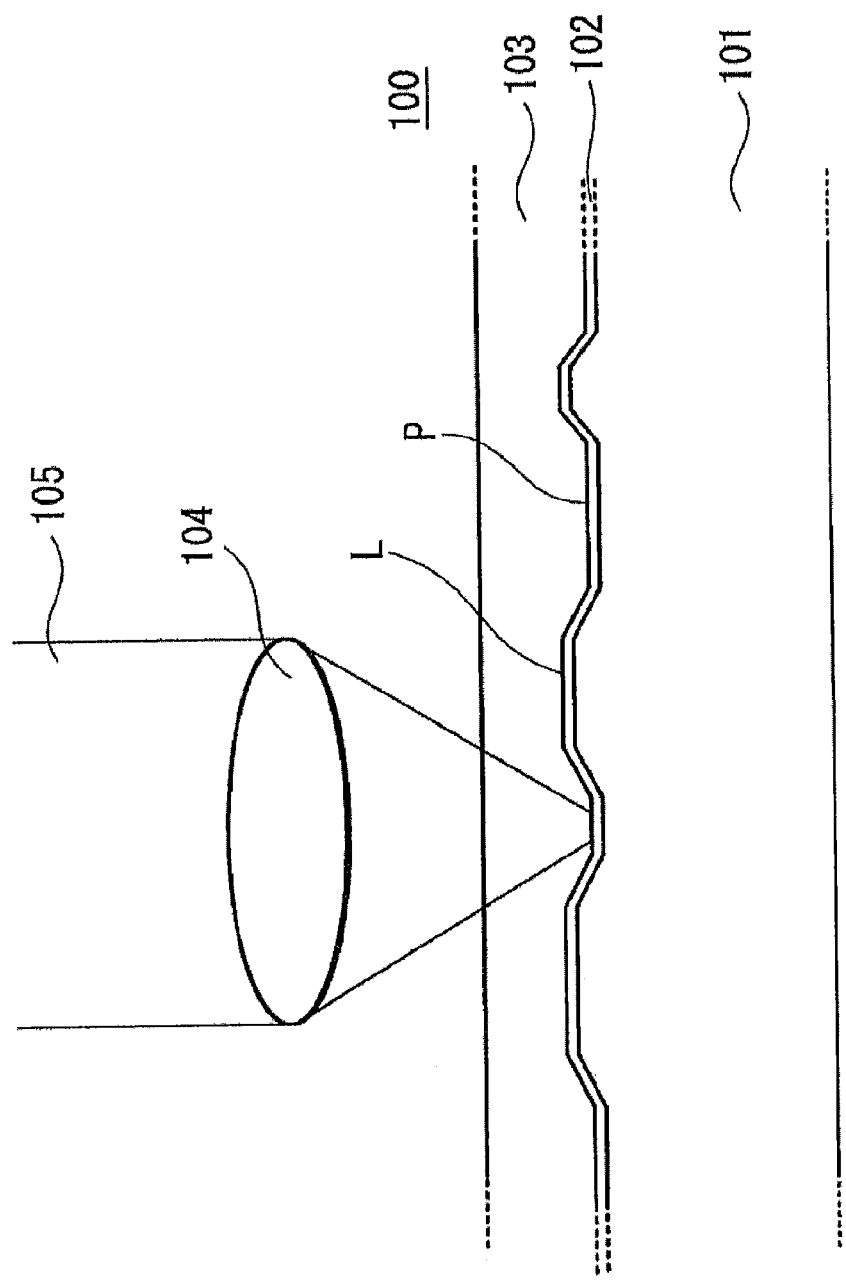
FIG. 1 is a schematic cross-sectional view of an example of the optical recording medium having a write once metal reflective film according to an embodiment.

FIG. 1 is a schematic cross-sectional view of an example of a read-only ROM optical disk 100 illustrated as an embodiment of the optical recording medium.

Specifically, the optical disk 100 employs a disk structure and a format complying with a disk called Blu-ray disc, for example.

As shown in the figure, the optical disk 100 includes a write once metal reflective film 102 and a cover layer 103 stacked on a substrate 101.

The substrate 101 is a plastic substrate formed of polycarbonate, for example. A surface of the substrate 101 in contact with the write once metal reflective film 102 is provided with an irregular cross-sectional shape. A recessed cross-section is a pit P, and a projected cross-section is a land L. Specifically, the cover layer 103 is irradiated with laser light 105, and a cross-section projected to an incidence side of the laser light 105 is the land L. Main data information is recorded with a combination of the pits P and the lands L, specifically, with a length of the pits P and a length of the lands L.

The write once metal reflective film 102 is stacked on an irregular surface of the substrate 101 on which the pits P and the lands L are formed. The cover layer 103 formed of polycarbonate or the like is further stacked on the write once metal reflective film 102.

The write once metal reflective film 102 is stacked on the substrate 101 and accordingly provided with an irregular cross-sectional shape corresponding to a shape of the pits P and the lands L.

The write once metal reflective film 102 receives reflected light corresponding to the irregularity when irradiated with the laser light 105 focused by an objective lens 104 through the cover layer 103 as shown in the figure.

The write once metal reflective film 102 is formed of an Ag alloy film of $Ag_{100-x-y}X_xCu_y$ (x, y: at %). Here the X is at least one element among elements of Ti, W, Ta, V, Mo, Nb and Zr, and a composition y of Cu in the Ag alloy film is selected to be $2 \leq y \leq 13$ [at %].

In other words, when the X is at least one element among elements of Ti, W, Ta, V, Mo, Nb and Zr, a composition y of Cu replacing Ag is selected to be $2 \leq y \leq 13$ [at %].

When the X is Ti, a composition x of Ti in the Ag alloy film is selected to be $4.5 \leq x \leq 17$ [at %].

When the X is W, a composition x of W in the Ag alloy film is selected to be $2.5 \leq x \leq 11$ [at %].

When the X is Ta, a composition x of Ta in the Ag alloy film is selected to be $0.6 \leq x \leq 10.5$ [at %].

In a composition of the Ag alloy film of $Ag_{100-x-y}X_xCu_y$, which is a composition of the write once metal reflective film, when the X is at least two elements among Ti, W, Ta, V, Mo, Nb and Zr, a total composition x of X in the Ag alloy film is selected to be $0.6 \leq x \leq 17$ [at %].

Figure 2:
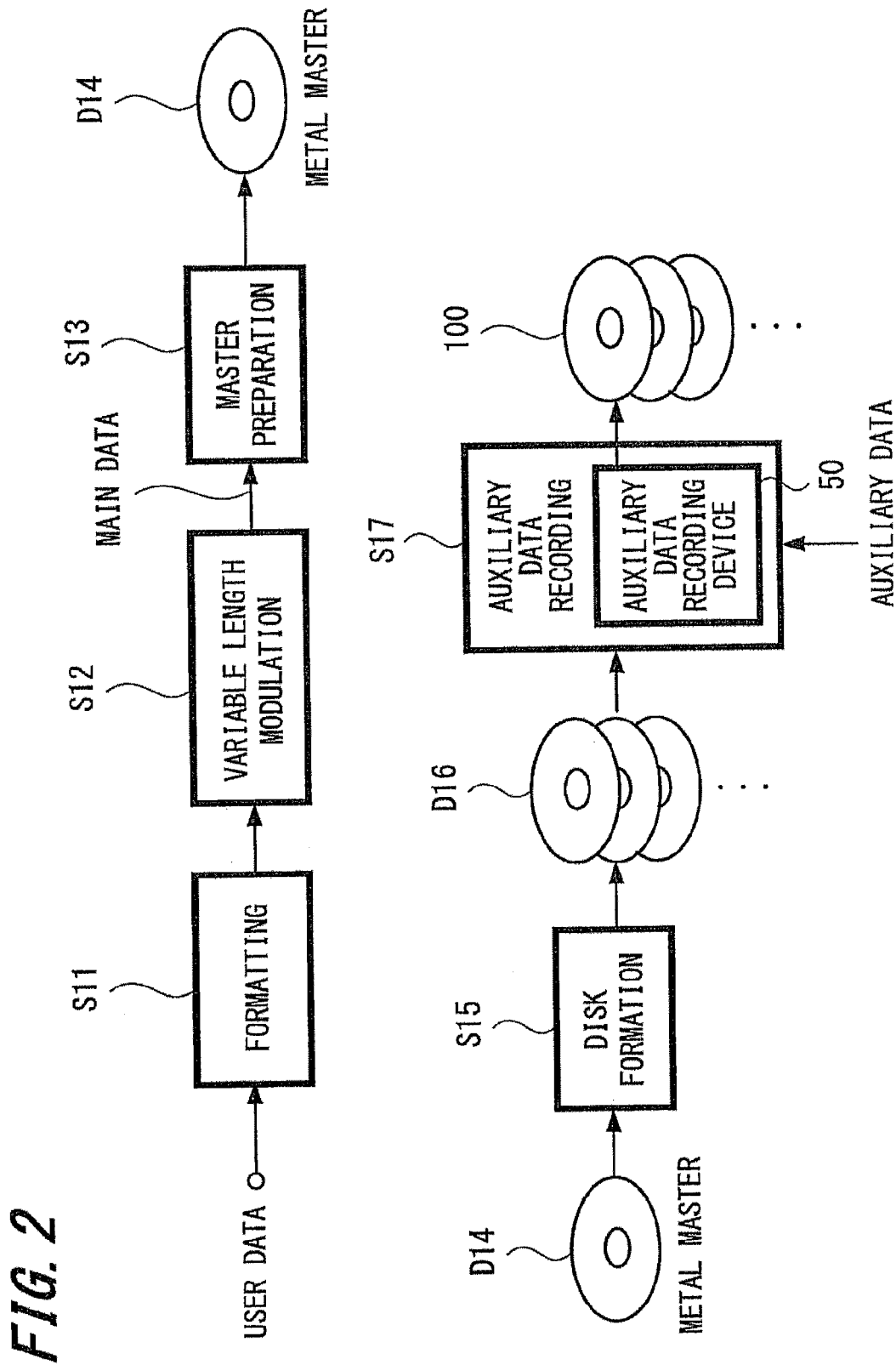
FIG. 2 is a view describing a manufacturing process for an example of the optical recording medium having a write once metal reflective film according to the embodiment.

In order to specify a configuration of an optical disk in an embodiment of the write once metal reflective film according to the embodiment, a manufacturing process for the optical disk 100 will be described first. FIG. 2 is a view describing a manufacturing process for the optical disk 100.

In this case, a formatting step S11 for user data is performed first. The formatting step S11 is performed using a computer, for example.

In the formatting step S11, content data (user data) that should be recorded on the optical disk 100 is converted to obtain a formatted data sequence complying with a predetermined standard. Specifically, in the present embodiment, the conversion is performed to obtain a data sequence complying with the Blu-ray disc standard described later in FIG. 3. Actually, addition of an error detection code and an error correcting code to user data, interleaving of user data and the like are also performed.

Next, a variable length modulation step S12 is performed. In the variable length modulation step S12, variable length modulation is performed on the data sequence generated at the formatting step S11. In the present embodiment, RLL (1,7) PP (Parity preserve/prohibit, RLL: Run Length Limited) modulation and NRZI (Non Return to Zero Inverse) modulation are performed.

The "0"/"1" pattern of the data sequence obtained at the variable length modulation step S12 is actually a pattern of pits and lands formed on the disk 100.

Data obtained by formatting and variable length modulation of user data as described above is herein called main data.

Next, a master preparation step S13 is performed. The master preparation step S13 is performed using a known mastering apparatus.

In the master preparation step S13, a photoresist is applied to a glass master first. Then, the glass master to which the photoresist is applied in this manner is rotationally driven and is irradiated in that state with laser light modulated according to the main data generated in the variable length modulation step S12 to develop the photoresist, so that an irregular pattern is formed along a recording track. In other words, pits and lands are formed.

Next, the glass master on which the pits and lands are formed is electrolytically plated, and the plating is separated to prepare a metal master D14.

A disk forming step S15 is performed using the metal master D14 obtained in this manner.

In the disk forming step S15, a stamper is first prepared based on the metal master D14. Then, the stamper is placed in a molding die, and the substrate 101 is formed of a transparent resin such as a polycarbonate or acrylic resin using an injection molding machine. The pattern of pits and lands according to the main data generated in the previous modulation step S12 is formed along a recording track on the substrate 101.

Then, the write once metal reflective film 102 is stacked on the substrate 101 by vapor deposition, sputtering or the like using a metal alloy target for depositing the write once metal reflective film according to the embodiment, and the cover layer 103 is further stacked on the write once metal reflective film 102. Accordingly, an optical disk (main data recorded disk) D16 is formed first on which only main data is recorded.

Next, an auxiliary data recording step S17 is performed. Specifically, auxiliary data is recorded in addition to the main data recorded with the aforementioned pattern of pits and lands.

In this case, unique serial number information, for example, is recorded as auxiliary data that is actual data prepared to form a data content on each disk D16 on which the main data has been recorded. Accordingly, a unique identification (identification number) is added to each optical disk 100 prepared at the auxiliary data recording step S17.

An error correcting code is also added as the auxiliary data, for example, in addition to an identification as actual data. Error correction for the identification may be performed during reproduction by adding the error correcting signal.

Auxiliary data is recorded as described later by forming a mark in a specific position in a specific section of the main data formed with pits and lands by irradiating the reflective film 102 with laser light using recording power.

Auxiliary data contains an identification and an error correcting code in this case; however, other data may also be added to the auxiliary data.

Figure 3:
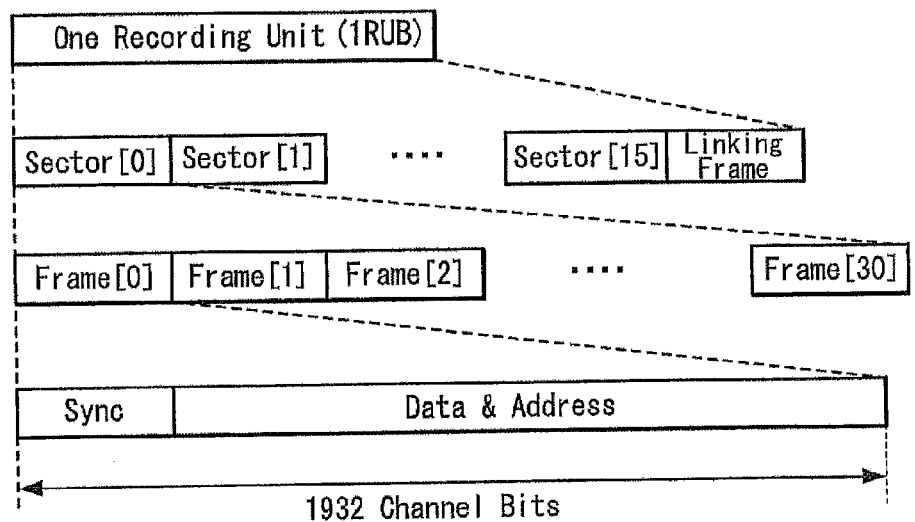
FIG. 3 is a view describing main data recorded on the optical recording medium having a write once metal reflective film according to the embodiment.

FIG. 3 is a view showing a data structure of main data recorded on the optical disk 100 manufactured by the above manufacturing process.

First, one recording unit called RUB is defined as shown in the figure. One RUB includes 16 sectors and two linking frames. The linking frame is provided as a buffer area between the RUBs.

In this case, one sector forms one address unit.

Each sector includes 31 frames as shown in the figure. One frame is formed with data of 1932 channel bits.

In a Blu-ray disc illustrated in the present embodiment, since main data complies with the RLL (1,7) PP modulation rule, the numbers of sequential codes "0" and "1" (that is, pit length and land length) are each limited to a length of 2T (channel bits) to 8T.

Sequential codes of 9T not complying with this modulation rule are inserted into sync placed at the top of each frame and are used for detecting a frame synchronization signal during reproduction.

Next, there will be described embodiments of the optical recording medium having a write once metal reflective film which has the aforementioned main data recorded and is subjected to recording of auxiliary data. However, it should be appreciated the embodiments are not limited to the examples described below.

First, there will be illustrated the optical recording medium having a write once metal reflective film according to the embodiment, which is formed with a write once metal reflective film having an Ag alloy film composition of $Ag_{100-x-y}X_xCu_y$ in which y=0, that is, the composition not containing Cu.

Example 1

As described above, the substrate 101 is prepared having an irregular pattern of pits and lands of main data formed on a surface.

The reflective film 102 formed of an Ag alloy film represented by $Ag_{100-x}W_x$ [at %] is deposited and formed on the substrate 101 by simultaneous sputtering of Ag and W so that the alloy film, that is, the reflective film 102 has a thickness of 40 nm in this case.

Samples of x=3.5, x=7 and x=10 are prepared to verify a difference in characteristics relative to the W composition in this configuration.

Example 2

The reflective film 102 having a thickness of 40 nm which is an Ag alloy film represented by $Ag_{100-x}Ta_x$ [at %] in this example is deposited on the same substrate 101 as in Example 1 by simultaneous sputtering of Ag and Ta.

Samples of x=1.8, x=7 and x=10 are prepared to verify a difference in characteristics relative to the Ta composition.

Example 3

The reflective film formed of an Ag alloy film represented by $Ag_{100-x}Ti_x$ [at %] is deposited on the same substrate 101 as in Example 1 by simultaneous sputtering of Ag and Ti. The reflective film has a thickness of 40 nm. Samples of x=7, x=10 and x=13 are prepared to verify a difference in characteristics relative to the Ti composition.

Example 4

The reflective film formed of an Ag alloy film represented by $Ag_{90}Ti_5V_5$ [at %] is deposited on the same substrate 101 as in Example 1 by simultaneous sputtering of Ag, Ti and V. The reflective film has a thickness of 40 nm.

Figure 4:
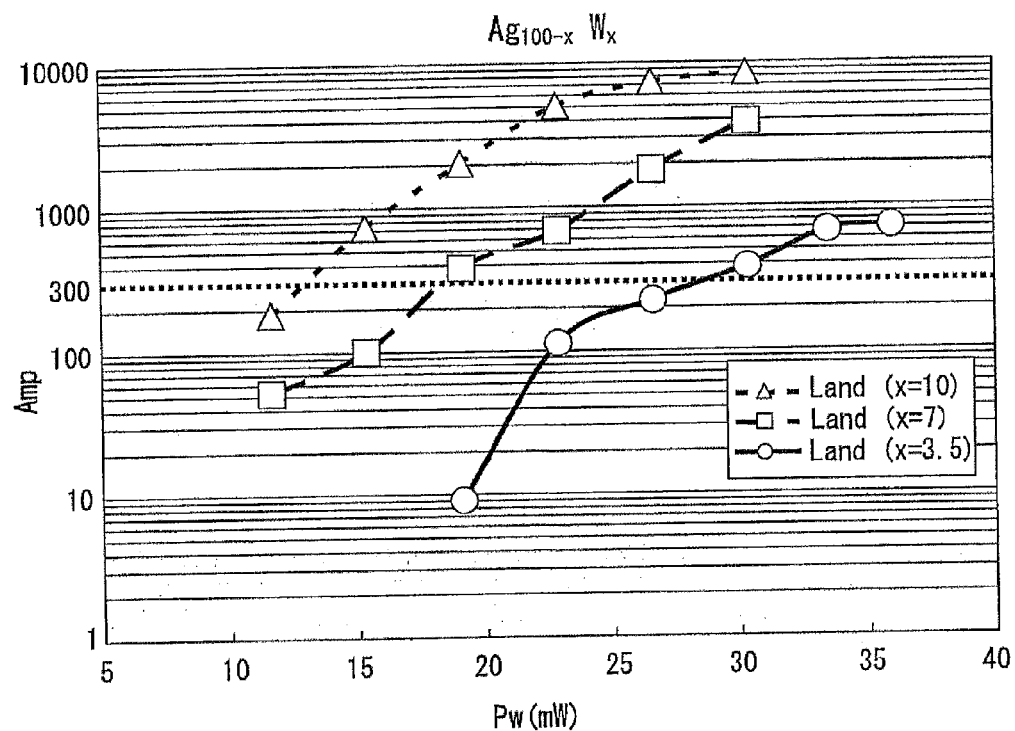
FIG. 4 is a view which shows an auxiliary data reproduction signal level relative to auxiliary data recording laser power in an optical recording medium having an AgW alloy reflective film.

FIG. 4 is a view in which reproduction signal levels in parts on which marks are formed in normal optical disks having the reflective film 102 of Example 1 formed of $Ag_{100-x}W_x$ [at %] where X=3.5, x=7 and x=10 are plotted with symbols "○", "□" and "Δ", respectively.

In FIG. 4, Amplitude (Amp) along the vertical axis indicates a value of a reproduction signal RF obtained by integrating values obtained by subtracting a value for a part on which a mark is not recorded from a value for a part on which a mark is recorded. As the value is higher, the value of reproduction signal RF is higher in a part on which a mark is recorded. In an embodiment, Amp≧300 is defined as a value at which an auxiliary data signal is suitably detected. Pw (mW) along the horizontal axis indicates recording laser power.

The recording conditions set for obtaining the experimental results shown in FIG. 4 are as follows.

A mark is recorded on a 6T land as a land having a predetermined length in the optical disk 100. The reflective film 102 of the optical disk 100 is the aforementioned AgW alloy film having a thickness of 40 nm.

The following conditions are set in an auxiliary data recording device 50 for manufacturing the optical disk 100.

Numerical aperture N.A.=0.85, laser wavelength λ=405 nm, recording linear velocity=4.9 m/s, mark write pulse=30 ns.

The optical disk 100 (main data recorded disk D16) has a structure complying with a Blu-ray disc illustrated in the embodiment and having a track pitch Tp of 320 nm, a 1T length of 78 nm, a pit width of Tp/3 and a pit depth of λ/5.

It is found that in a normal disk with a W content of 3.5 [at %], a value of Amplitude along the vertical axis (Amp) is increased at a value higher than the zero level using laser power at about 17 mW or higher so that Amp≧300 at 28 mW or higher. In other words, it is found that recording power at 28 mW or more is required to obtain a suitable auxiliary data signal at a W content of 3.5 [at %].

Figure 5:
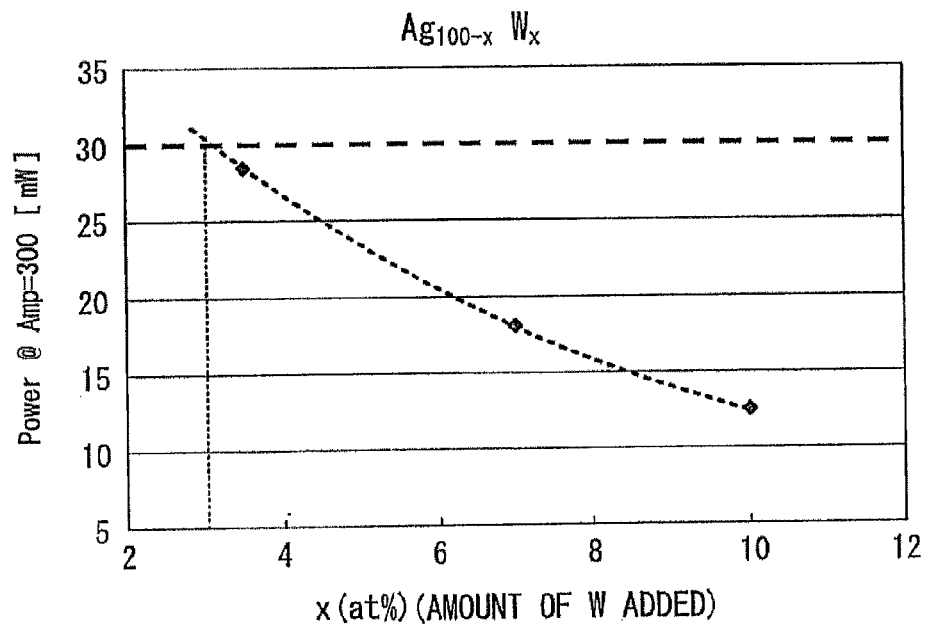
FIG. 5 is a view which shows minimum laser power with which an auxiliary data reproduction signal is suitably detected relative to an amount of W added in an optical recording medium having an AgW alloy reflective film.

Similarly, minimum necessary recording power is 18 mW at a W content of 7 [at %], and minimum necessary recording power is 12.5 mW at a W content of 10 [at %]. FIG. 5 shows plotted values of minimum recording power necessary for suitably detecting an auxiliary data signal relative to the W content in the AgW alloy film.

As is clear from FIG. 5, a value of necessary recording power is increased as a W content is decreased. The recording power may not be indefinitely increased and is desirable to be as small as possible from the viewpoint of mass production and economical efficiency in the manufacture of normal optical disks. In this example, its upper limit is estimated as 30 mW. As is clear from FIG. 5, a W content at which a suitable signal is detectable even when auxiliary data is recorded using laser power at 30 mW or less is 3 [at %] or more.

Figure 6:
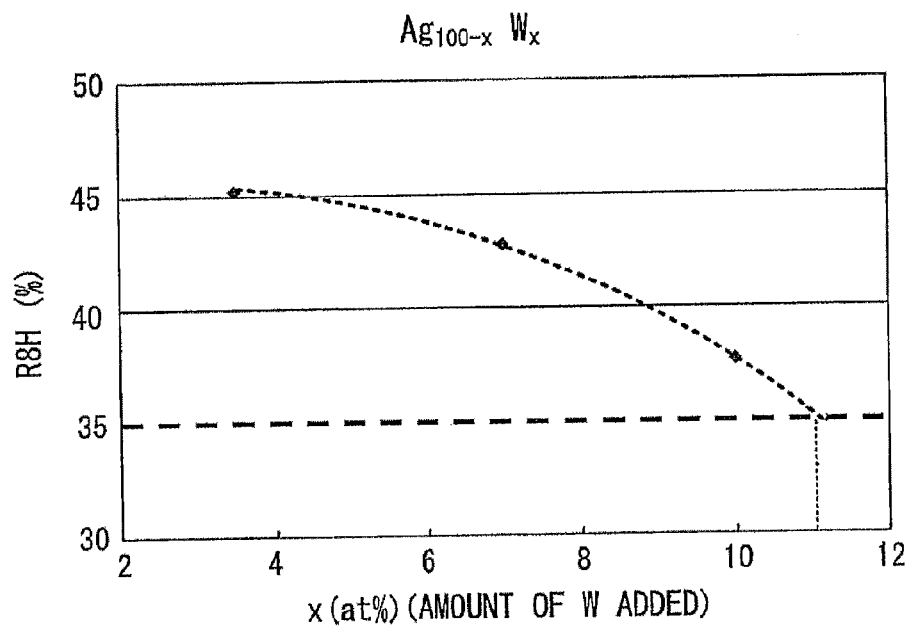
FIG. 6 is a view which shows a reflectance of a main data reproduction signal (R8H) relative to an amount of W added in an optical recording medium having an AgW alloy reflective film.
Figure 7:
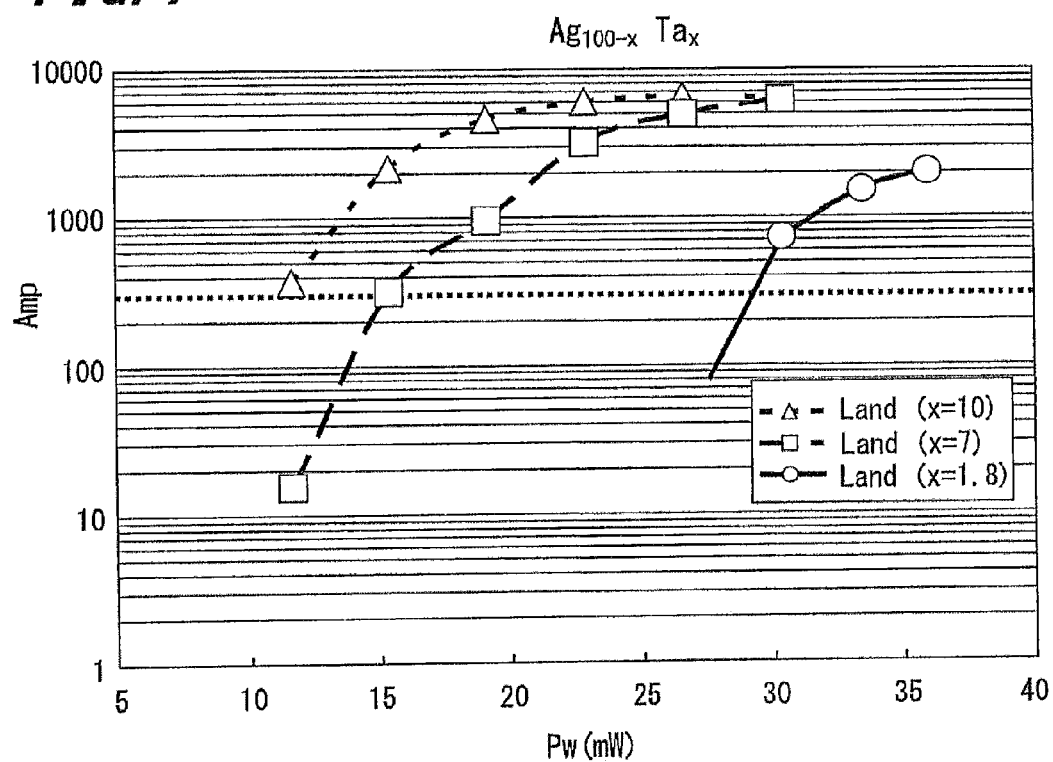
FIG. 7 is a view which shows an auxiliary data reproduction signal level relative to auxiliary data recording laser power in an optical recording medium having an AgTa alloy reflective film.

Next, FIG. 6 shows reflectance characteristics of main data reproduction signals in three optical disks each having a W content of 3.5, 7 or 10 [at %].

Here, R8H is a maximum reflectance of a signal defined in the Blu-ray disc standard and corresponding to a longest mark (8T mark) of main data. It is assumed that in a read-only Blu-ray disc having a single information layer (single layer disk), this value is required to be 35% or more.

As is clear from FIG. 6, R8H is decreased as a W content is increased, and a W content satisfying R8H≧35% is 11 [at %] or less.

As is clear from the above examination, a disk having an AgW alloy with a W content of 3 to 11 [at %] may provide suitable main data and auxiliary data signals.

Contents of elements added for providing suitable main data and auxiliary data signals are also determined for Example 2 (AgTa alloy) and Example 3 (AgTi alloy) in the same manner as for Example 1.

Optical disks having a content x=1.8, x=7 or x=10 [at %] are examined for Example 2, and optical disks having a content x=4, x=7 or x=10 [at %] are examined for Example 3. Data of these Examples 2 and 3 are shown in FIGS. 7 to 9 and FIGS. 10 to 12.

From the same viewpoint as for each optical disk of Example 1, it is found that optical disks of Examples 2 and 3 may also provide suitable main data and auxiliary data signals when each reflective film formed of an AgTa alloy has a Ta content x of 1.1 to 10.5 [at %] and each reflective film formed of an AgTi alloy has a Ti content x of 5 to 17 [at %].

Figure 13:
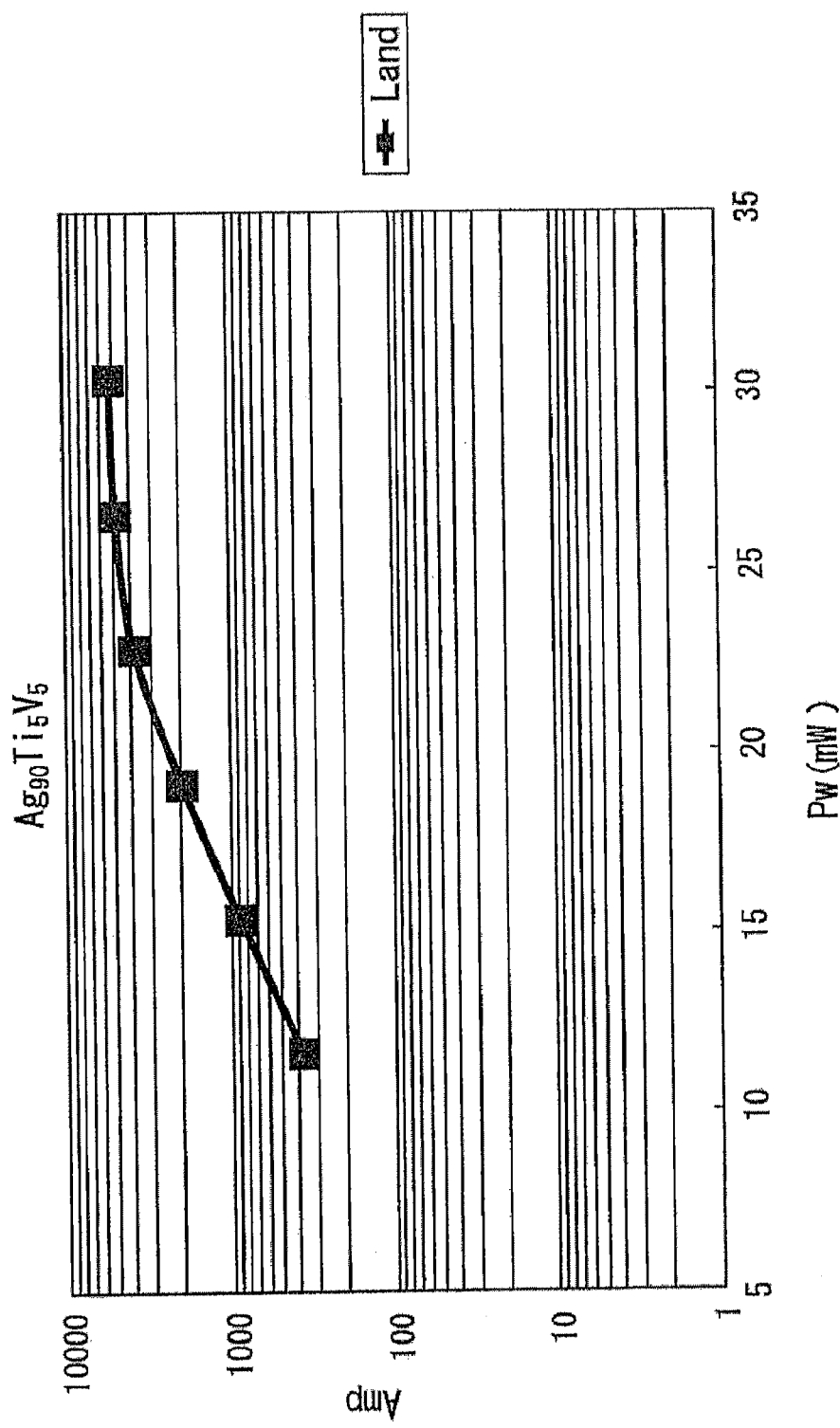
FIG. 13 is a view which shows an auxiliary data reproduction signal level relative to auxiliary data recording laser power in an optical recording medium having an AgTiV alloy reflective film.

It is found that an optical disk of Example 4 may also be provided with a reproduction signal level increased in a part on which a mark is formed as shown in FIG. 13. When at least two elements among Ti, W, Ta, V, Mo, Nb and Zr are added to Ag as in Example 4, there is also formed an optical disk, that is, an optical recording medium having a write once metal reflective film, where a mark is formed so that a reproduction signal level is increased in a part on which the mark is formed on the aforementioned land having a predetermined length, and a reproduction signal level is decreased in a part on which the mark is formed in an optical disk generated by physically transferring a shape of the substrate 101 of the optical disk 100.

Next, an experiment is performed to verify that a normal disk and a pirated disk are reverse in auxiliary data signal polarity to each other, using an optical disk of Examples 1 and 2 having an additive element content of 10 [at %] and an optical disk of Example 3 having an additive element content of 7 [at %].

In this case, the reflective film 102 and the cover layer 103 are separated from the optical disk 100 as a normal copy for which it is verified that an auxiliary data signal is recorded and reproduced. The separation is performed using a method of dissolving the reflective film 102 by a wet process and removing the cover layer 103 at the same time.

The substrate 101 from which the reflective film 102 and the cover layer 103 are separated in this manner is sufficiently dried. Thereafter, the reflective film 102 and the cover layer 103 are newly formed. Here, it is previously verified that a surface of the substrate 101 has not been affected by alteration or the like in the previous separation process. The reflective film 102 is formed of an Ag alloy-sputtered film having a total amount of the element added to Ag of 1 [at %] or less.

Figure 14:
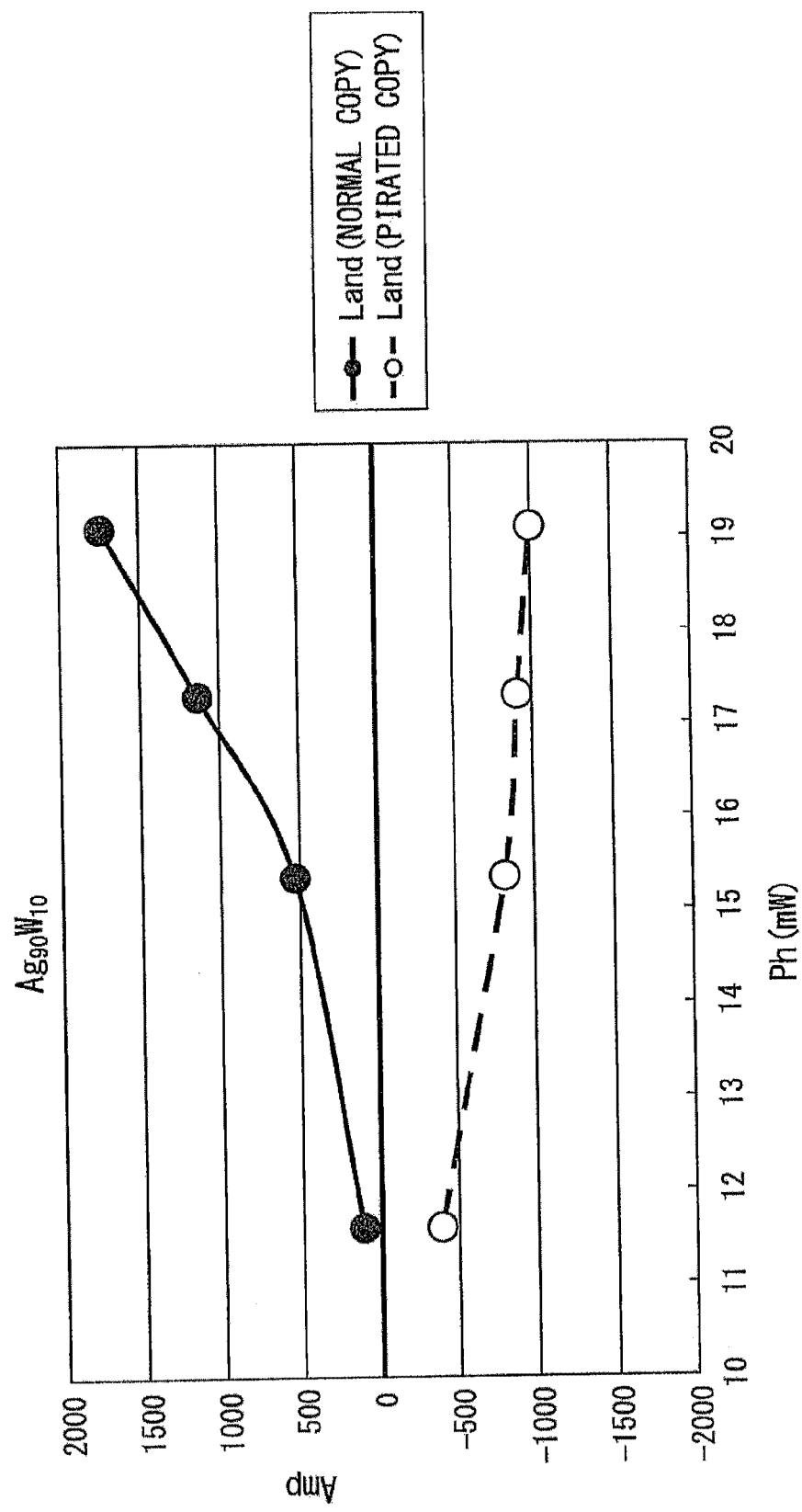
FIG. 14 is a graph which comparatively shows auxiliary data signal polarities of a normal optical disk and a pirated optical disk of a normal optical recording medium of an optical recording medium having an AgW alloy reflective film.
Figure 15:
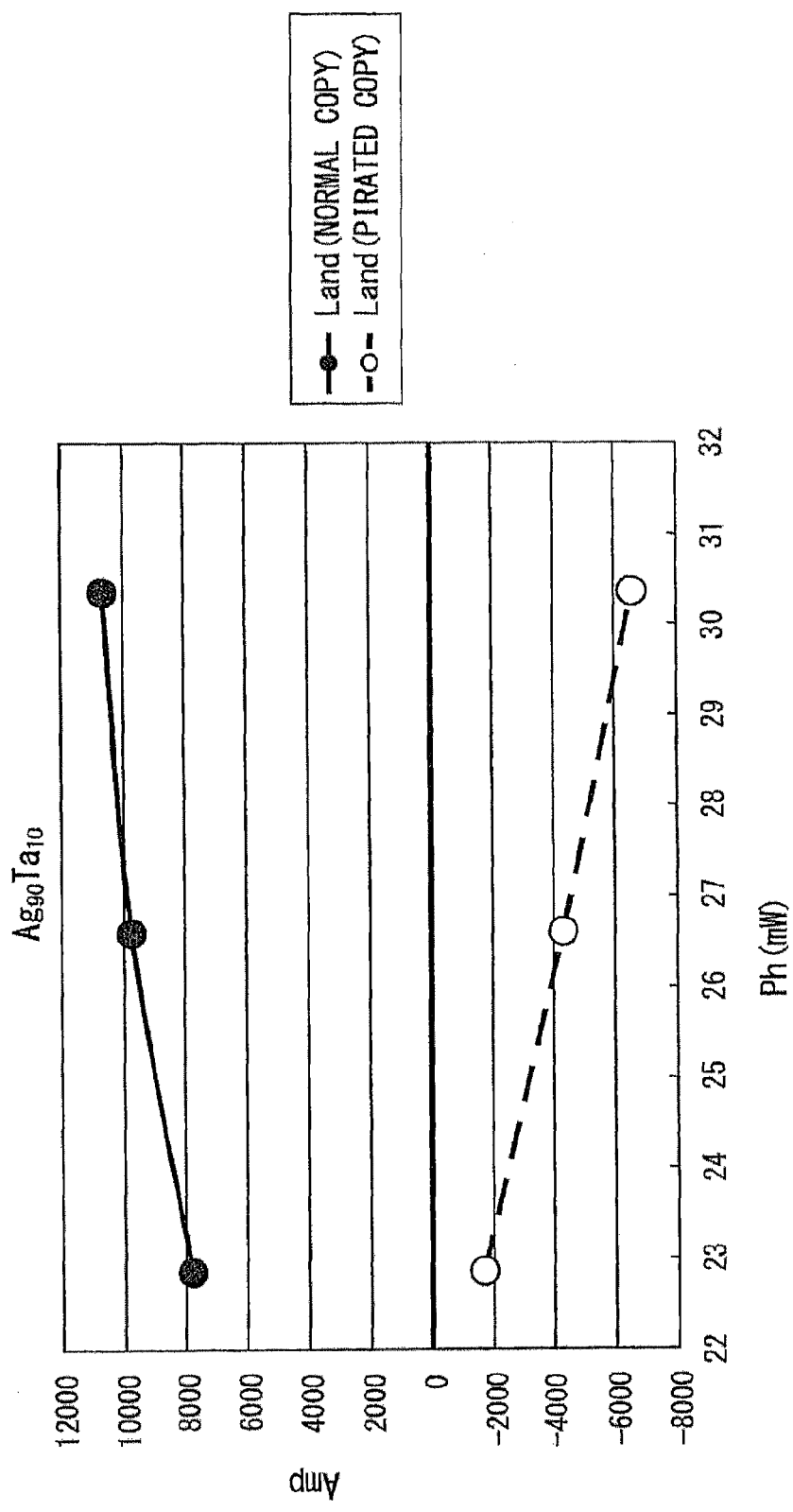
FIG. 15 is a graph which comparatively shows auxiliary data signal polarities of a normal optical disk and a pirated optical disk of a normal optical recording medium of an optical recording medium having an AgTa alloy reflective film.
Figure 16:
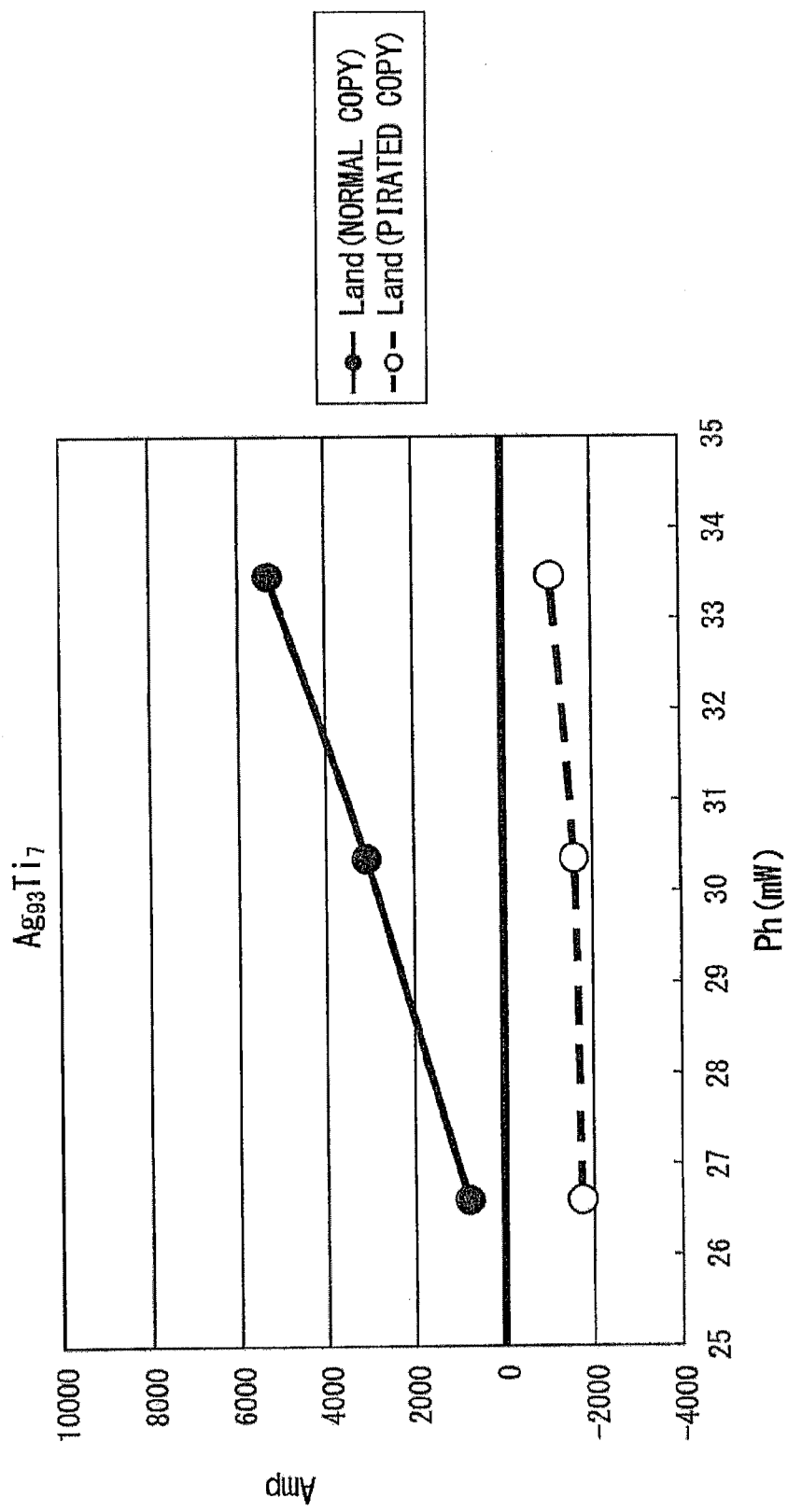
FIG. 16 is a graph which comparatively shows auxiliary data signal polarities of a normal optical disk and a pirated optical disk of a normal optical recording medium of an optical recording medium having an AgTiW alloy reflective film.

FIGS. 14, 15 and 16 are graphs each comparatively showing auxiliary data signal polarities of a normal optical disk and a pirated optical disk of $Ag_{100-x}X_x$.

FIG. 14 shows a case where x=10 in Example 1, that is, a case of $Ag_{90}W_{10}$, FIG. 15 shows a case where x=10 in Example 2, that is, a case of $Ag_{90}Ta_{10}$, and FIG. 16 shows a case where x=7 in Example 3, that is, a case of $Ag_{93}Ti_7$. In each figure, a solid curve and a broken curve show plotted results of measuring an auxiliary data reproduction signal relative to recording laser power in a normal optical disk (normal copy) and a pirated optical disk (pirated copy), respectively.

Polarity is inversed in any case.

Next, occurrence of such a phenomenon is studied in Examples 5 and 6.

In these examples, there are studied characteristics of a reproduction signal level in a normal disk and characteristics of a reproduction signal level in a pirated disk prepared from the normal disk by physical transfer, specifically, physical transfer of a substrate shape, in a part on which a mark is recorded when recording is performed on a land using an Ag alloy.

Example 5

A polycarbonate disk substrate is prepared having a flat mirror surface and having a diameter of 120 mm and a thickness of 1.1 mm. A thin film, that is, a reflective film formed of an Ag alloy containing 6.8 at % of Ti is deposited thereon with a thickness of 40 nm.

A polycarbonate film having a thickness of 0.1 mm is caused to adhere to the thin film using a UV-curable resin which is then cured by UV irradiation to form a cover layer, thereby preparing a disk. The disk structure is the same as the basic structure of a read-only Blu-ray disc.

Next, the disk is heated by irradiation with laser light having a oval spot shape with a minor axis of about 1 μm and a major axis of about 200 μm and having a wavelength of 810 nm from the cover layer side.

The heating by laser light irradiation is performed at a disk rotational speed of 3 m/sec. In this case, irradiation laser power is about 10 mW/μm². A heated region on the disk is a ring-shaped region having a radius of about 35 mm to about 45 mm and a width of about 10 mm.

Example 6

The same polycarbonate substrate as in Example 5 is prepared. In this example, a thin film, that is, a reflective film having a thickness of 40 nm formed of an Ag alloy containing 10.0 at % of Ta is deposited thereon.

A polycarbonate film having a thickness of 0.1 mm is caused to adhere to the thin film using a UV-curable resin which is then cured by UV irradiation to form a cover layer, thereby preparing a disk in the same manner as in Example 5.

Next, the disk is heated by irradiation with laser light having a oval spot shape with a minor axis of about 1 μm and a major axis of about 200 μm and having a wavelength of 810 nm from the cover layer side.

In the heating with laser light, a disk rotational speed is 6 m/sec. Irradiation laser power is about 5 mW/μm². A heated region by the laser light irradiation on the disk is a ring-shaped region having a radius of about 35 mm to about 45 mm and a width of about 10 mm.

Reflectances of a region not heated by the aforementioned laser light irradiation (non-heated) and a region irradiated with laser light (heated) are measured in the aforementioned disks of Examples 5 and 6, respectively. The results are shown in Table 1 of FIG. 17. In this measurement, reflectances at wavelengths of 410 nm, 670 nm and 790 nm are measured using a spectroscopic ellipsometer.

According to Table 1 in FIG. 17, in any disk of Examples 5 and 6, a reflectance in the heated region, that is, a part on which auxiliary data is recorded, is higher than a reflectance in the non-heated region at any measurement wavelength.

Figure 18:
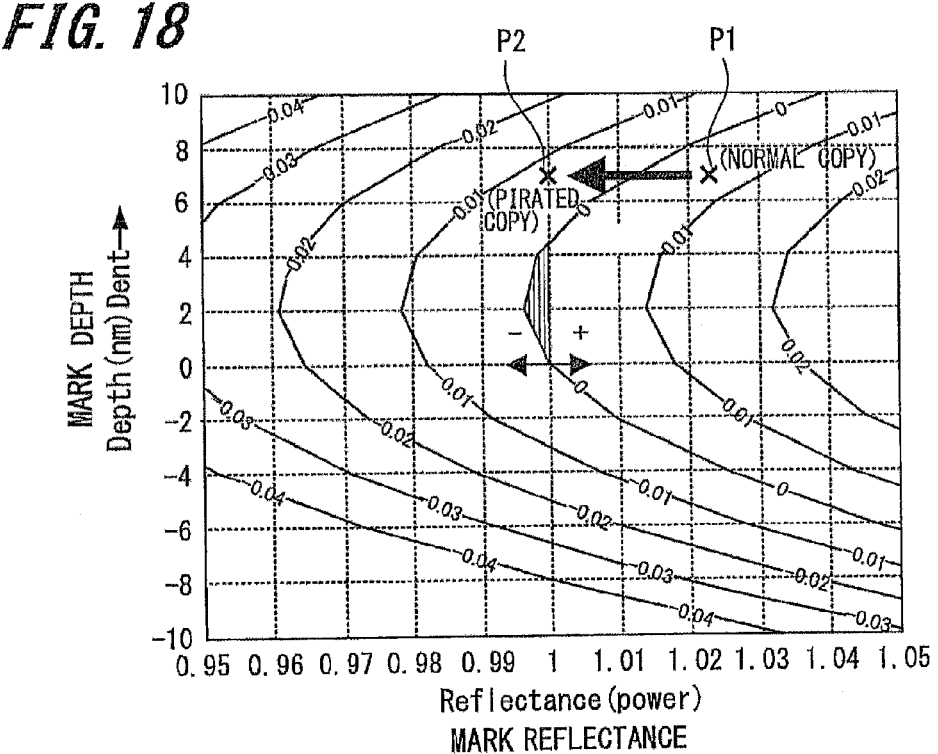
FIG. 18 is a view showing results of simulating a relation between a reflectance and a mark depth with respect to an output of a differential signal between a part on which auxiliary data is recorded and a region on which auxiliary data is not recorded.

FIG. 18 is a view showing results of simulating a relation between an output of a differential signal between a region on which auxiliary data is recorded and a region on which auxiliary data is not recorded and a reflectance and a mark depth of a recorded mark.

The FIG. 68 shows a differential contour, and a depth of a recorded mark is indicated along the vertical axis. A value at which a reflectance is not changed is indicated as "1" along the horizontal axis.

As described initially, a depth of a mark is a depth of a dent by local deformation in a heated part by auxiliary data recording on a reflective film formed on a polycarbonate substrate, for example, in an optical recording medium.

The dent is measured to have a depth of about 7 nm by observation of its cross-section using a transmission electron microscope, for example.

As described in FIG. 17, a reflectance is increased after recording (after heating) in the optical disk having an Ag alloy film according to the embodiment. Here, output polarity of a differential signal indicated by a point P1 is +(plus), for example.

On the contrary, when a pirated disk is prepared from a normal copy by a method such as physical transfer, a reflectance is returned to an original one and only a mark depth remains changed. Therefore, output of a differential signal is − (minus) as indicated by a point P2 of FIG. 18. Accordingly, it is understood that output signal polarity of a pirated disk is reverse to that of a normal copy.

In the optical recording medium having a write once metal reflective film described above, the write once metal reflective film is formed of $Ag_{100-x}X_x$ not containing Cu.

Next, the optical recording medium according to the embodiment having a composition of $Ag_{100-x-y}X_xCu_y$ containing Cu, that is, having a write once metal reflective film containing Cu will be described with reference to its embodiments.

It is found from the embodiments that a write once metal reflective film containing Cu within a specific composition range reduces a lower limit of a preferable composition range of a constituent element X in the aforementioned write once metal reflective film not containing Cu and widens the range. The reason will be described in the following embodiments.

Embodiment 1

As in the aforementioned Example 1, the substrate 101 is prepared having an irregular pattern of pits and lands of main data formed on a surface.

On the substrate 101, the substrate 101 is prepared having an irregular pattern of pits and lands of main data formed on a surface.

The reflective film 102 formed of an Ag alloy film represented by $Ag_{100-x-y}X_xCu_y$ [at %] where X=W was deposited and formed on the substrate 101 by simultaneous sputtering of Ag and W with a thickness of 40 nm.

Samples of y=0, y=8, y=10, y=12.7 and y=17.3 were prepared to verify a difference in characteristics relative to the Cu composition in this configuration.

Embodiment 2

As in Embodiment 1, the reflective film 102 formed of an Ag alloy film represented by $Ag_{95-y}Ta_5Cu_y$ [at %] was formed on the substrate 101 by depositing three metal alloy targets prepared for depositing a write once metal reflective film, each of which has a composition of $Ag_{95}Ta_5$, $Ag_{91.5}Ta_5Cu_{3.5}$ or $Ag_{90.5}Ta_5Cu_{4.5}$, with a thickness of about 40 m by sputtering using a sheet sputtering apparatus. Samples of y=0, y=3.5 and y=4.5 were prepared in this manner to verify a difference in characteristics relative to the Cu composition.

Samples of y=0, y=3.5 and y=4.5 were prepared to verify a difference in characteristics relative to the Cu composition in this configuration.

Figure 19:
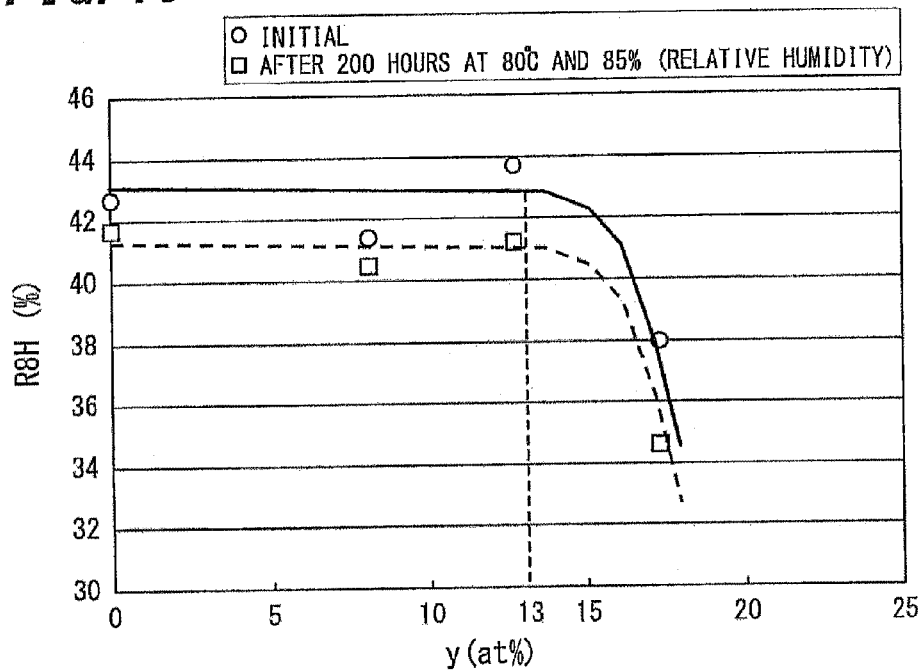
FIG. 19 is a view showing results of measuring a relation between an amount of Cu added and a reflectance of a main data reproduction signal (R8H) before and after an accelerated test in an AgTaCu alloy reflective film in an example of the optical recording medium having a write once metal reflective film according to the embodiment.

FIG. 19 shows reflectance characteristics of main data reproduction signals in normal optical disks having the write once metal reflective film 102 of Example 1 formed of $Ag_{96-y}Ta_4Cu_y$ [at %], where y=0, y=8, y=12.7 or y=17.3. A symbol "○" corresponds to an initial characteristic, and a symbol "□" represents a reflectance characteristic after completion of an accelerated test at 80° C. and 85% (relative humidity) for 200 hours. Here, R8H is a maximum reflectance of a signal defined in the Blu-ray disc standard and corresponding to a longest mark (8T mark) of main data.

There is almost no significant difference in terms of an initial reflectance and a reflectance after the accelerated test for 200 hours between a case where Cu is added at 12.7 at % or less and a case where Cu is not added (y=0); however, when Cu is added at more than 12.7 at %, the reflectances are reduced presumably due to Cu.

According to FIG. 19, Cu is equivalent in function to Ag for reflectance characteristics when Cu is added at about 13 at % or less.

Figure 20:
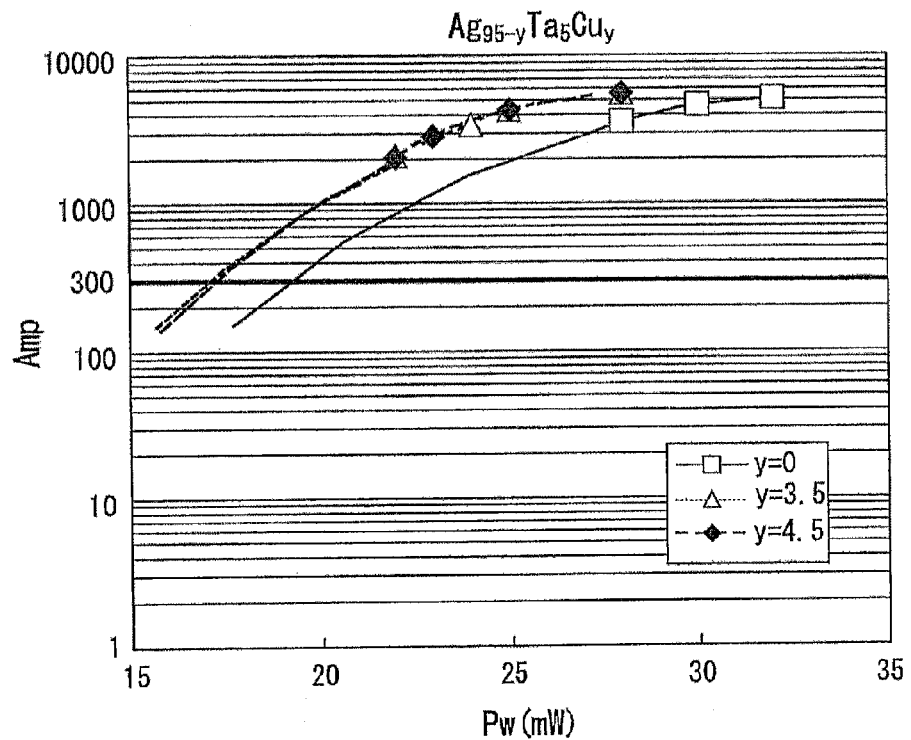
FIG. 20 is a view showing results of measuring a relation between auxiliary data recording laser power and an auxiliary data reproduction signal level when an amount of Cu added is changed in an AgTaCu alloy reflective film in an example of the optical recording medium having a write once metal reflective film according to the embodiment.

FIG. 20 is a view showing reproduction signal levels in normal optical disks having the write once metal reflective film 102 of Embodiment 2 formed of $Ag_{95-y}Ta_5Cu_y$ [at %], where y=0, y=3.5 or y=4.5, with recording power Pw changed in a part on which a mark is formed, the reproduction signal levels plotted with a symbol "□" when y=0, a symbol "Δ" when y=3.5 and a symbol "◆" when y=4.5, respectively.

Figure 21:
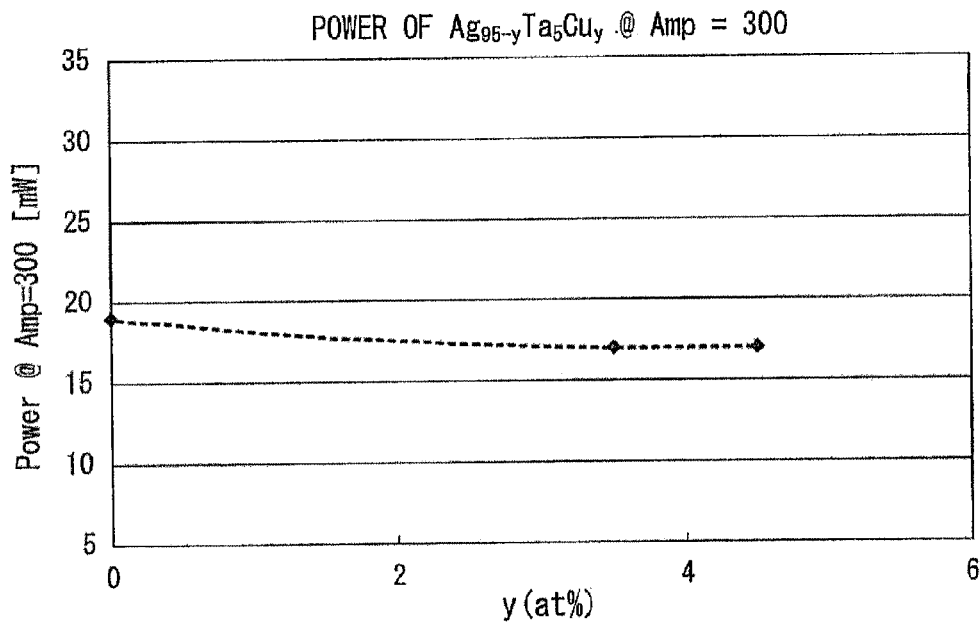
FIG. 21 is a view showing an amount of Cu added and a value of minimum recording power with which an auxiliary data signal is suitably detected in an AgTaCu alloy reflective film in an example of the optical recording medium having a write once metal reflective film according to the embodiment.

FIG. 21 is a view showing plotted values of minimum recording power necessary for suitably detecting an auxiliary data signal relative to a Cu content in the $Ag_{95-y}Ta_5Cu_y$ alloy film by determination of recording power necessary for obtaining a desired Amp value (300) when y=0 (about 19 mW) from FIG. 20 and determination of necessary recording power when y=3.5 or y=4.5 in the same manner. It is understood that necessary recording power may be reduced by replacing Cu by Ag and the reducing effect when y=2.0 is approximately the same as the reducing effect when y=3.5 or y=4.5.

Figure 8:
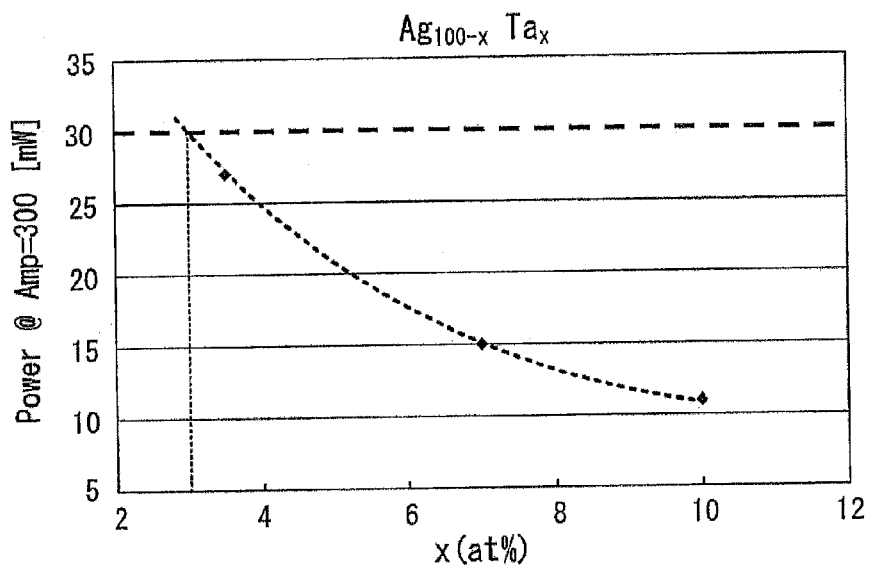
FIG. 8 is a view which shows minimum laser power with which an auxiliary data reproduction signal is suitably detected relative to an amount of W added in an optical recording medium having an AgTa alloy reflective film.
Figure 9:
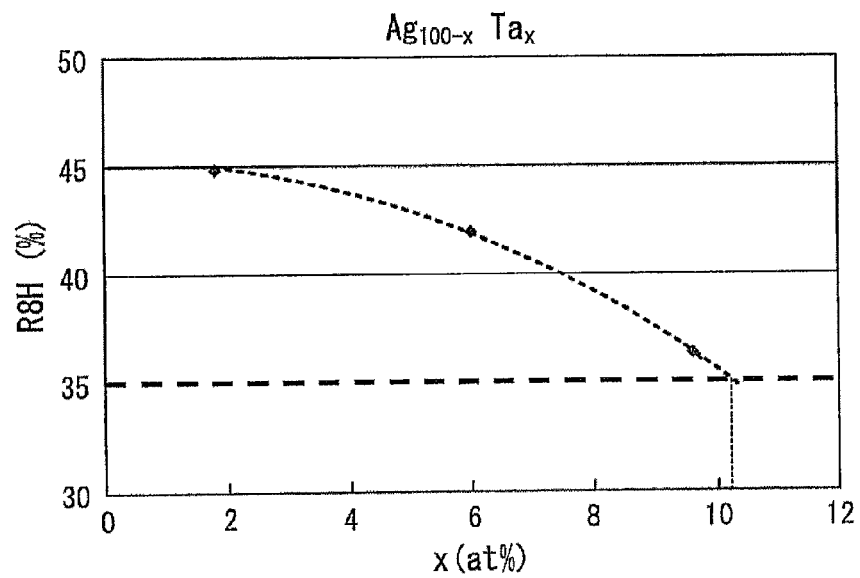
FIG. 9 is a view which shows a reflectance of a main data reproduction signal (R8H) relative to an amount of W added in an optical recording medium having an AgTa alloy reflective film.
Figure 10:
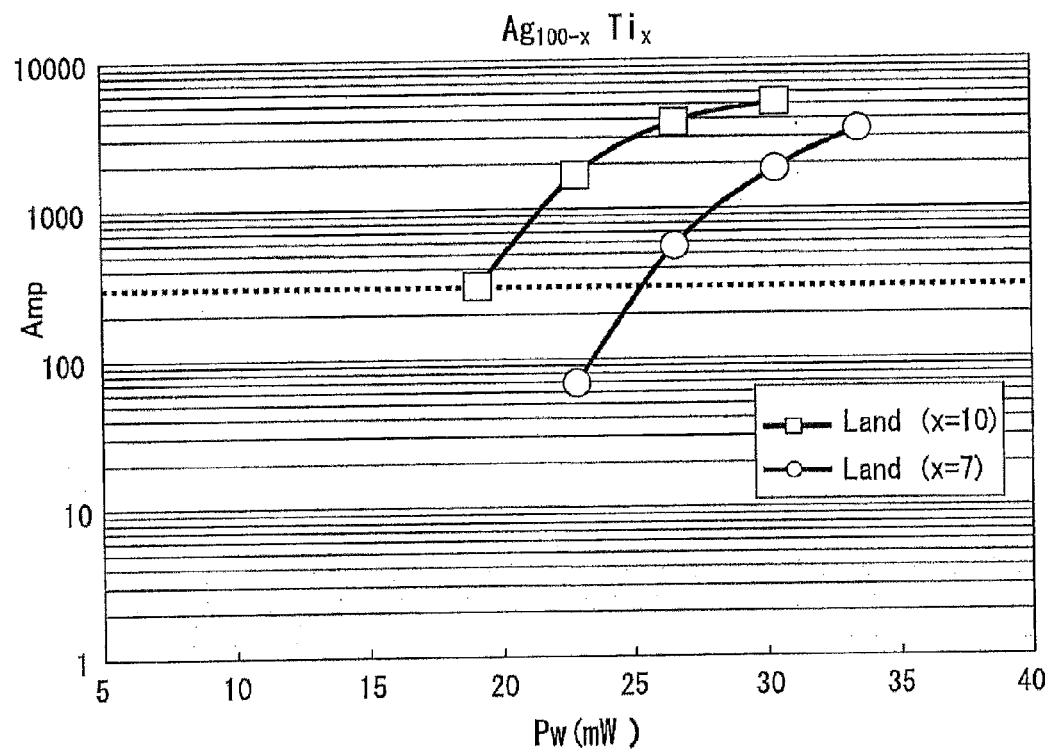
FIG. 10 is a view which shows an auxiliary data reproduction signal level relative to auxiliary data recording laser power in an optical recording medium having an AgTi alloy reflective film.
Figure 22:
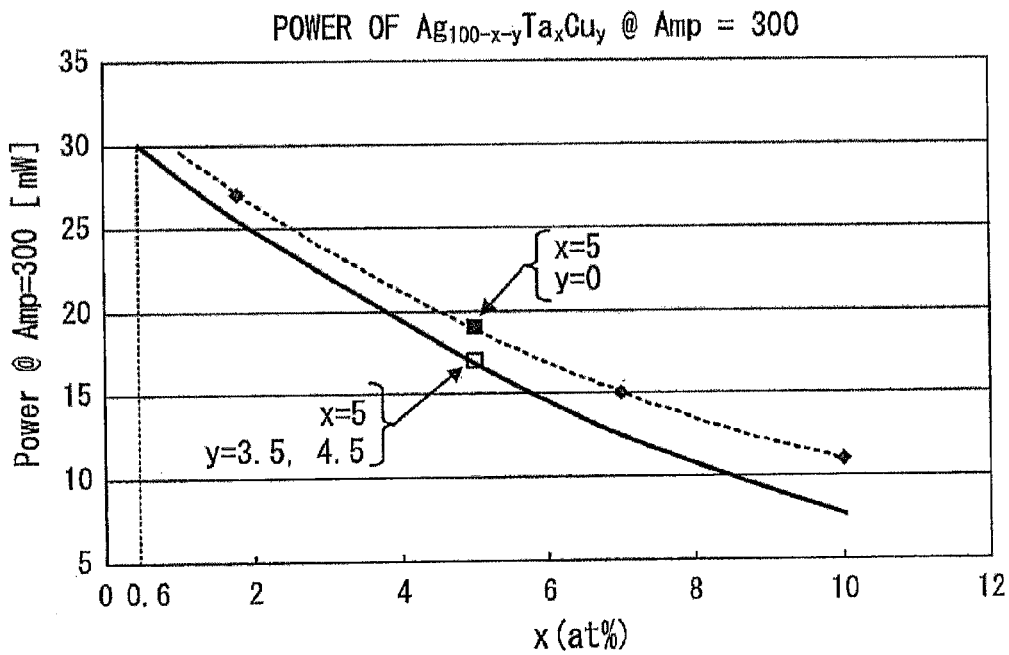
FIG. 22 is a view showing an amount of Ta added and a value of minimum recording power with which an auxiliary data signal is suitably detected in an AgTaCu alloy reflective film in an example of the optical recording medium having a write once metal reflective film according to the embodiment.

FIG. 22 is a view showing a relation between a Ta amount x and recording power in the write once metal reflective film formed of $Ag_{100-x}Ta_x$ of the aforementioned FIG. 8 in the same composition $Ag_{95-y}Ta_5Cu_y$ as shown in FIGS. 20 and 21 (Ta amount x=5), where power when y=0 is plotted as a symbol "■" and power when y=3.5 or 4.5 is plotted as a symbol "□". According to the figure, the composition where y=0 in FIGS. 21 and 22 corresponds to the curve of FIG. 8. Minimum recording power in the film having a Cu content y of 3.5 or 4.5 [at %] is smaller than that in the film not containing Cu where y=0. This means that the lower limit of an amount of Ta added which is provided in Example 2 may be further decreased by addition of Cu. According to an auxiliary line shown in FIG. 22 passing through a symbol "□" and following a curve passing through a symbol "■" when y=0, an effect of reducing the lower limit of an amount of Ta added by replacing Ag by Cu is at least 0.5 [at %]. In other words, a preferable composition range of an amount of Ta added is widened by 0.5 [at %] and has a lower limit of 0.60% or more by addition of Cu. This applies not only to a case where an element X is Ta but also to a case where an element X is Ti or W.

Figure 11:
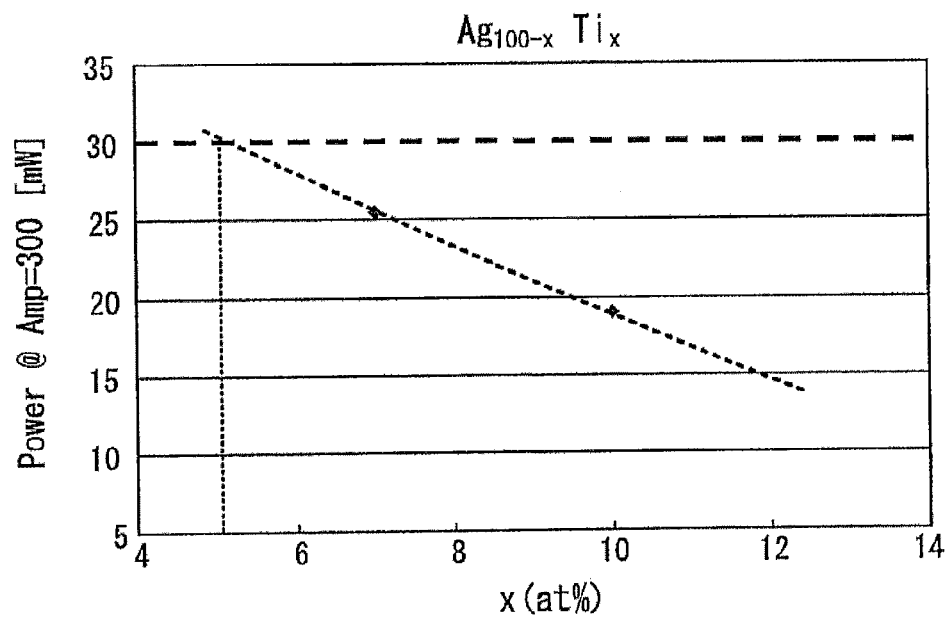
FIG. 11 is a view which shows minimum laser power with which an auxiliary data reproduction signal is suitably detected relative to an amount of W added in an optical recording medium having an AgTi alloy reflective film.
Figure 12:
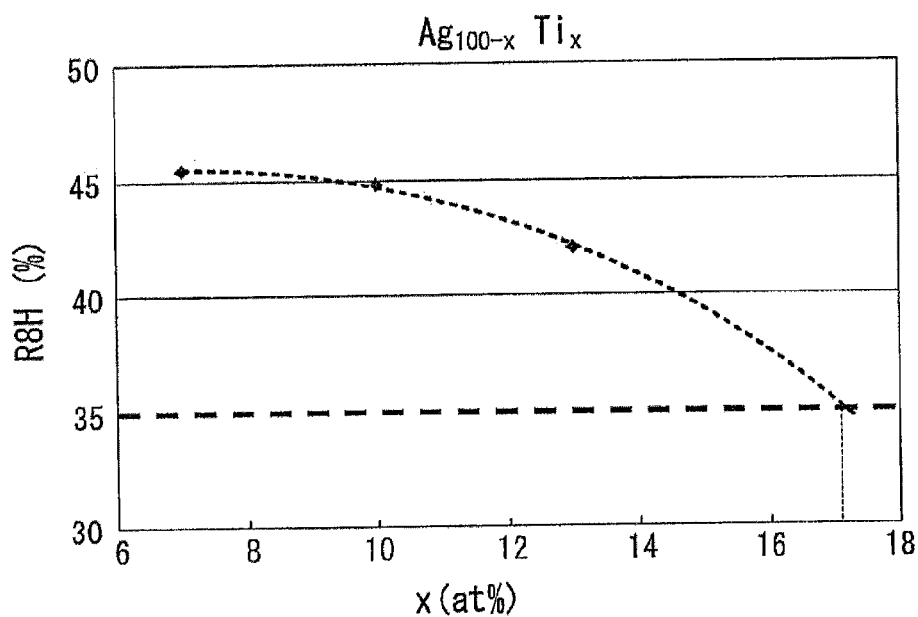
FIG. 12 is a view which shows a reflectance of a main data reproduction signal (R8H) relative to an amount of W added in an optical recording medium having an AgTi alloy reflective film.
Figure 23:
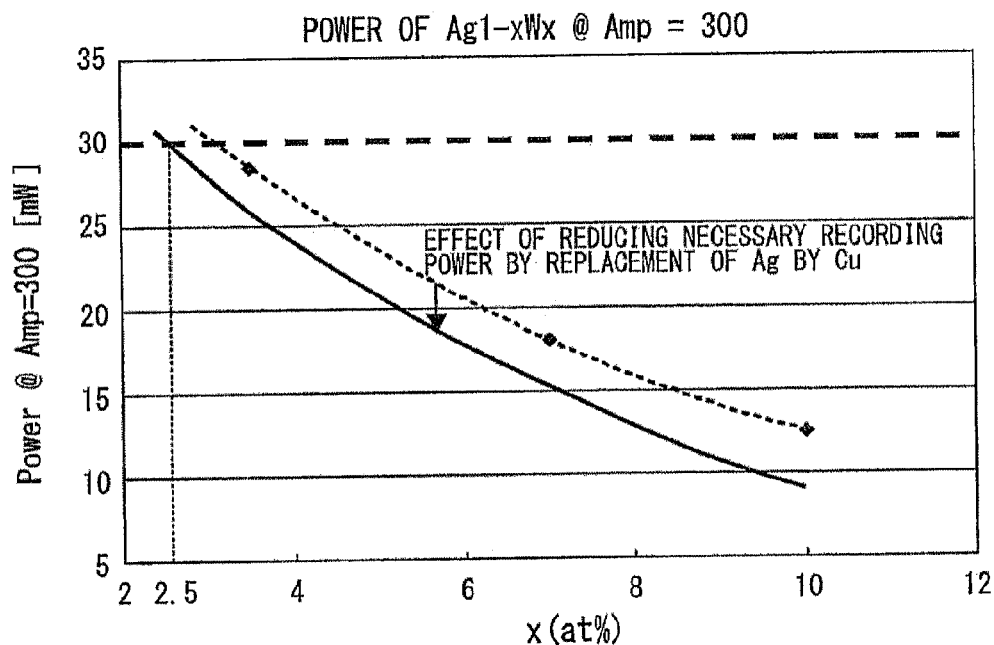
FIG. 23 is a view which shows an amount of W added and a value of minimum recording power with which an auxiliary data signal is suitably detected in an AgW alloy reflective film.
Figure 24:
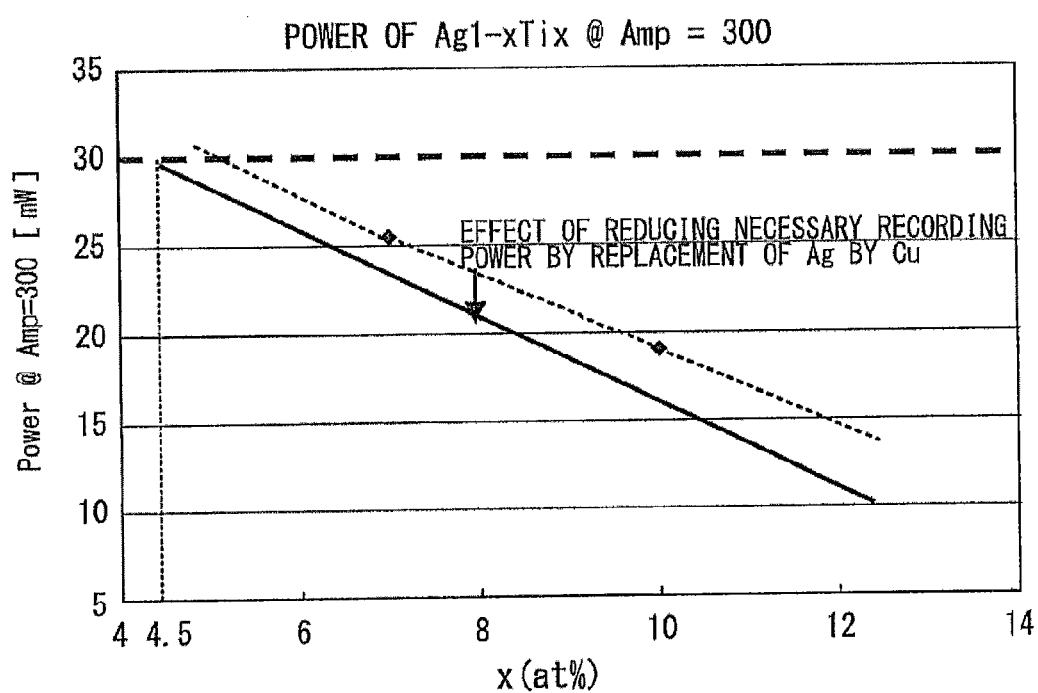
FIG. 24 is a view which shows an amount of Cu added and a value of minimum recording power with which an auxiliary data signal is suitably detected in an AgCu alloy reflective film.

FIGS. 23 and 24 show an effect of replacing Ag by Cu in a case where an element X is W or Ti in relation to FIGS. 5 and 11 as in a relation between FIG. 8 and FIG. 22.

From the results of Embodiments 1 and 2, it is easily found that when an amount of Cu added in $Ag_{100-x-y}X_xCu_y$ [at %] is 2 at % to 13 at % within a corresponding range of x provided in Examples 1 to 4 for $Ag_{100-x}X_x$ [at %] not containing Cu, where an element X is Ti, Ta or W, respectively, a reflectance characteristic is not impaired, and a characteristic effect for generating auxiliary data is preserved even if a lower limit of x is decreased by 0.5 at %.

Further, also in a case where the film contains Cu, a phenomenon described in paragraph [0073] and FIG. 17 occurs and a pirated disk is reverse in output signal polarity to a normal copy.

Next, there will be described, with reference to the following embodiments, a characteristic of the write once metal reflective film newly improved compared to that of the above film having a composition containing Cu or not containing Cu, that is, an effect of suppressing growth of coarse Ag particles easily occurring in an Ag alloy film (hereinafter referred to as hillock).

Embodiment 3

Figure 25:
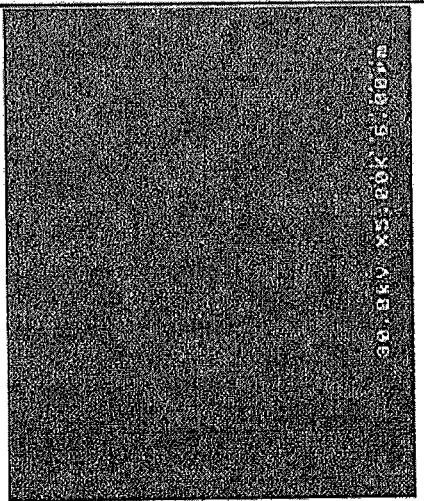
FIGS. 25A and 25B are SEM photographs of surfaces of write once metal reflective films in an example and a comparative example of the optical recording medium having a write once metal reflective film according to the embodiment.

A disk having the same configuration as in the aforementioned Embodiments with an $Ag_{96}Ta_4$ or $Ag_{96-\alpha}Ta_4$(Cu, Sn, Ge, Nd, Mn, Au), thin film was prepared to evaluate hillock generation behavior after an environmental test (accelerated test) at 80° C. and 85% for 96 hours. The upper and lower photographs of FIG. 25A are a 5000×SEM (scanning electron microscope) photograph and a 200000×SEM photograph of a write once metal reflective film formed of $AgTa_{4.0}Cu_{4.0}$, respectively. The upper and lower photographs of FIG. 25B are a 5000×SEM photograph and a 200000×SEM photograph of a write once metal reflective film formed of $AgTa_{4.0}$ not containing Cu, respectively.

As is clear from the photographs, hillock generated in $Ag_{96}Ta_4$ is effectively suppressed by addition of Cu. It is verified by the same SEM observation that hillock is not suppressed and is rather increased by addition of additive elements other than Cu such as Au, Sn, Mg, Ge, Nd and Mn.

Embodiment 4

A sample having an $Ag_{100-x-y}X_xCu_y$ thin film was prepared to evaluate hillock generation behavior after an environmental test at 80° C. and 85% for 96 hours. Four samples were prepared where x=about 4 at % and y=1.6, y=2.3, y=3.3 or y=5.6 at %.

In these samples, a 40 nm thin film having the aforementioned composition is formed on a polycarbonate substrate, and a protective layer such as a cover is not formed thereon.

Figure 26:
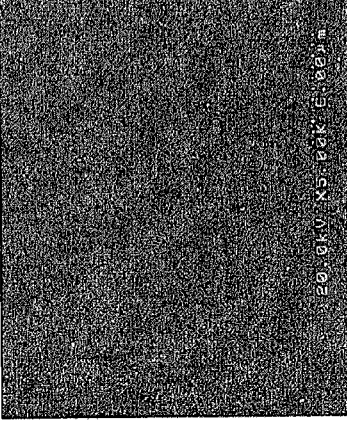
FIG. 26 shows SEM photographs of surfaces of write once metal reflective films in an example and a comparative example of the optical recording medium having a write once metal reflective film according to the embodiment.

FIG. 26 is 5000×SEM photographs showing surfaces of these four samples after an environmental test (accelerated test). In FIG. 26, an SEM photograph of Sample 1 as a comparative example where y=1.6 is on the upper left, an SEM photograph of Sample 2 where y=2.3 is on the upper right, an SEM photograph of Sample 3 where y=3.3 is on the lower left, and an SEM photograph of Sample 4 where y=5.6 is on the lower right.

From this it is verified that a sample having a Cu amount y of 1.6 at % is not effective for suppressing hillock, but a sample having a Cu amount of 2.3 at % is effective for suppressing hillock. Since an external factor such as water is a trigger for generation of the hillock, weatherability of the structure of the sample of the present embodiment without a protective layer such as a cover is lower than that of the structure of the optical recording medium contemplated in the embodiment. Accordingly, it is found from the results of FIG. 26 that hillock generation resistance, in other words, weatherability may be drastically improved in the optical recording medium having a write once metal reflective film when at least 2 at % of Cu is added.

Results of measuring a change in reflectance ΔR (%) of each sample by the environmental test are described at the bottom of these SEM photographs.

According to this, in Sample 1, a reflectance after the environmental test is reduced by 24.21% from an initial reflectance, and therefore a change in reproduction signal is too large. On the other hand, in Samples 2 to 4, since a reflectance is reduced by less than 3%, a change in reproduction signal is acceptable and the reproduction signal may be read suitably.

Embodiment 5

Samples where X=Ti or X=W were prepared as examples of $Ag_{100-x-y}X_xCu_y$ where X=other than Ta to evaluate hillock generation behavior after an environmental test at 80° C. and 85% for 96 hours, respectively. The two prepared samples where X=Ti are Sample 5 as a comparative example where (x, y)=(3.9, 0.5) and Sample 6 where (x, y)=(5.5, 5.1). The two prepared samples where X=W are Sample 7 as a comparative example where (x, y)=(7.1, 0) and Sample 8 where (x, y)=(5.9, 3.8). A sample having a Cu amount of less than 2 at % may be compared with a sample having a Cu amount of 2 at % or more for each X.

Figure 27:
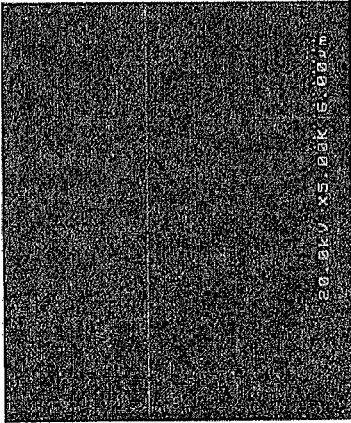
FIG. 27 shows SEM photographs of surfaces of write once metal reflective films in an example and a comparative example of the optical recording medium having a write once metal reflective film according to the embodiment.

FIG. 27 is 5000×SEM photographs showing surfaces of these four samples after an accelerated test in the above environmental test. The cases of Samples 5 and 6 are shown on the upper left and the upper right, and the cases of Samples 7 and 8 are shown on the lower left and the lower right. As is clear from the photographs, hillock is generated in the samples where X=Ti or W having a Cu amount of less than 2.0 at % as in the sample where X=Ta; however, hillock is not generated at all and is effectively suppressed in the samples where X=Ti or W having a Cu amount of 2.0 at % or more.

Similarly, results of measuring a change in reflectance ΔR (%) of each sample by the environmental test are described at the bottom of the SEM photographs.

According to this, also in Samples 5 and 7, a reflectance after the environmental test is reduced by about 9% from an initial reflectance, and a change in reproduction signal is large. However, in Samples 6 and 8, since a reflectance is reduced by less than 3%, a change in reproduction signal is acceptable and the reproduction signal may be read suitably.

Results of measuring a change in reflectance R by the aforementioned accelerated test in Samples 1 to 8 shown in FIGS. 26 and 27 are shown at the bottom of the SEM photographs. From the results of Samples 2 to 6 and Sample 8 according to the embodiment other than Samples 1 and 7 as comparative examples and the results in the aforementioned Embodiments 3, 4 and 5, it is found that hillock easily generated in an Ag alloy film may be controlled only by addition of Cu, and its amount added is preferably 2 at % or more. This corresponds to a lower limit of a Cu amount of 2 at % provided from the aforementioned Embodiments 1 and 2.

Next, there will be described an example of an auxiliary data recording device by which the aforementioned auxiliary data is recorded on the aforementioned optical recording medium according to the embodiment, for example, the optical disk 16.

(Auxiliary Data Recording Device)

FIG. 32 is a configuration diagram of an example of the auxiliary data recording device.

As described above, a unique identification is recorded on each optical disk 100 as a data content of auxiliary data. Accordingly, the auxiliary data recording device 50 records auxiliary data having a different pattern for each optical disk 100 (D16) mounted thereon.

A section on which auxiliary data is recorded is determined in advance on the optical disk D16, and a position into which each mark is inserted is previously determined within this section. The auxiliary data recording device 50 may record a mark in such a predetermined specific position.

First, the optical disk D16 mounted on a turntable (not shown) is rotationally driven by a spindle motor 51 according to a predetermined rotational driving system. An optical pickup OP reads a recording signal (main data) from the optical disk D16 rotationally driven in this manner.

The optical pickup OP includes a laser diode LD forming a laser light source; an objective lens 52 for focusing and applying laser light onto a recording surface of the optical disk 100; and a photodetector PD detecting light reflected from the optical disk D16 after the laser light irradiation.

Reflected light information detected by the photodetector PD in the optical pickup OP is converted to an electric signal in an I-V conversion circuit 53 and then supplied to a matrix circuit 54. The matrix circuit 54 generates a reproduction signal RF, a tracking error signal TE and a focus error signal FE based on the reflected light information from the I-V conversion circuit 53.

A servo circuit 55 controls a tracking drive signal TD and a focus drive signal FD output from a biaxial drive circuit 56 based on the tracking error signal TE and the focus error signal FE from the matrix circuit 54. The tracking drive signal TD and the focus drive signal FD are supplied to a biaxial mechanism (not shown) holding the objective lens 52 in the optical pickup OP. The objective lens 52 is driven in a tracking direction and a focusing direction in response to these signals. In a tracking servo/focus servo system including the servo circuit 55, the biaxial drive circuit 56 and the biaxial mechanism, the servo circuit 55 performs controlling based on the tracking error signal TE and the focus error signal FE, so that a beam spot of laser light applied to the optical disk D16 traces a pit sequence (recording track) formed on the optical disk D16 and is maintained in an appropriate focusing state.

The reproduction signal RF generated in the matrix circuit 54 is supplied to a binarization circuit 57 and converted to "0"/"1" binary data here. The binary data is supplied to a synchronous detection circuit 58 and a PLL (Phase Locked Loop) circuit 59.

The PLL circuit 59 generates a clock CLK synchronous with the supplied binary data and supplies it as a necessary operating clock for each part. In particular, the clock CLK is also supplied as an operating clock for the binarization circuit 57 and the synchronous detection circuit 58, an address detection circuit 60 and an auxiliary data generating circuit 61 described as follows.

The synchronous detection circuit 58 detects a sync pattern inserted into each frame shown in FIG. 3 above from the supplied binary data. Specifically, it detects a 9T section which is a sync pattern in this case to perform frame synchronization detection.

A frame synchronization signal is supplied to each part that needs the signal such as the address detection circuit 60.

The address detection circuit 60 detects address information based on the frame synchronization signal and the supplied binary data. The detected address information is supplied to a controller (not shown) totally controlling the auxiliary data recording device 50 and is used for seeking or the like. The address information is also supplied to a write pulse generating circuit 63 in the auxiliary data generating circuit 61.

As shown in the figure, the auxiliary data generating circuit 61 includes the write pulse generating circuit 63 and a RAM (Random Access Memory) 62. The auxiliary data generating circuit 61 generates a write pulse signal Wrp for recording auxiliary data that should be recorded on the optical disk D16 in a later-described form of FIG. 29, based on input auxiliary data and the address information supplied from the address detection circuit 60 and the clock CLK supplied from the PLL circuit 59.

A laser power control part 64 controls laser power of the laser diode LD in the optical pickup OP based on the write pulse signal Wrp output from the auxiliary data generating circuit 61. Specifically, the laser power control part 64 in this case performs control so that laser output with reproduction power may be obtained when the write pulse signal Wrp is at an L (low) level. Control is performed so that laser output is recording power when the write pulse signal Wrp is at an H (high) level.

Laser irradiation with recording power is performed by the control of laser power control part 64, so that a mark is formed on the reflective film 102 in a part subjected to the laser irradiation. In this manner, auxiliary data is recorded on the optical disk D16 with a mark formed on the reflective film 102.

Figure 29:
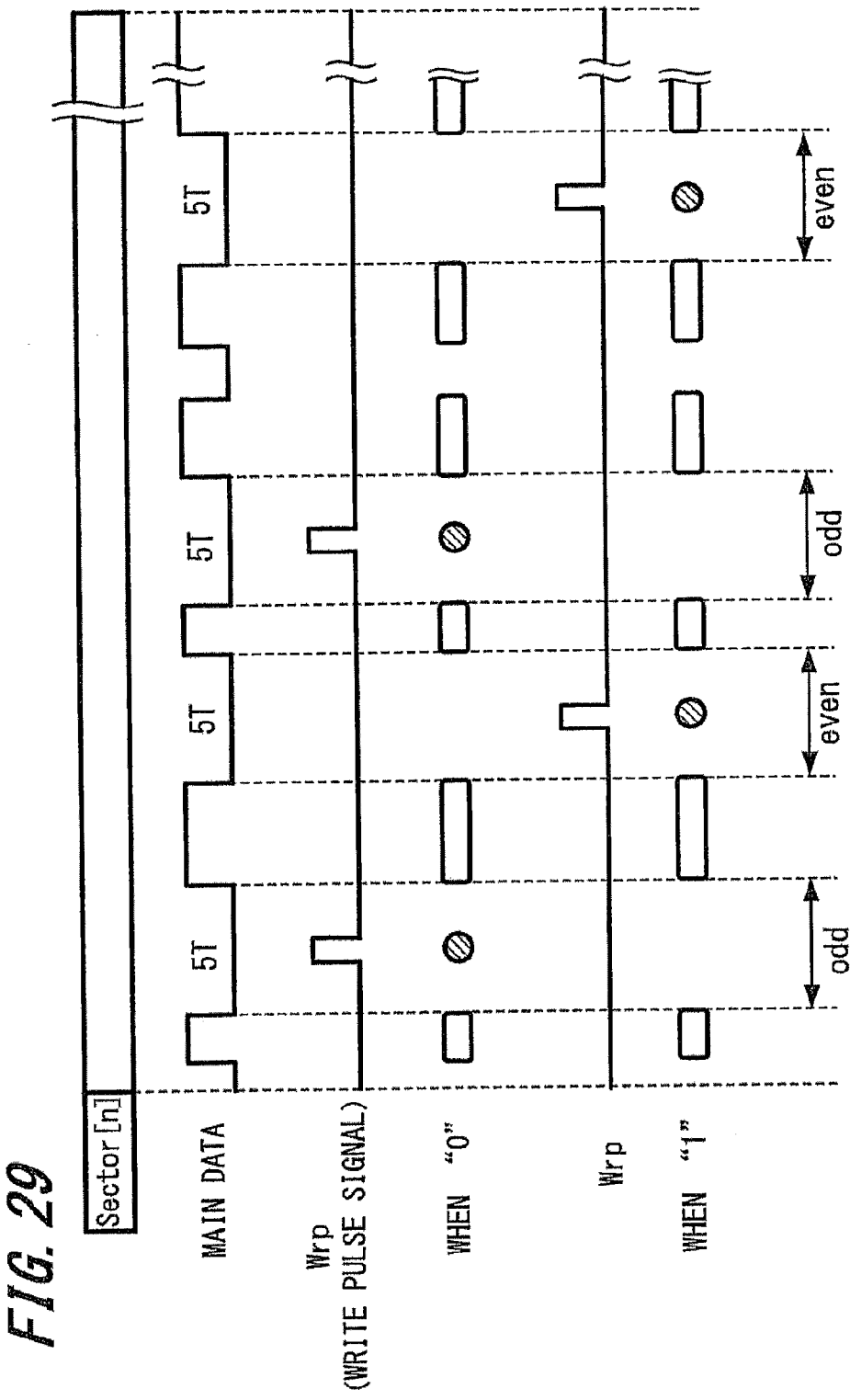
FIG. 29 is a view describing recording of auxiliary data on the optical recording medium having a write once metal reflective film according to embodiment.

FIG. 29 is a view for describing a form of recording auxiliary data which is intended to be realized through an operation of the auxiliary data generating circuit 61.

FIG. 29 shows a case where "0" is recorded as a one-bit code forming auxiliary data and a case where "1" is recorded as such a one-bit code, respectively.

In a code expression method, it is first assumed that adjacent odd-numbered (odd) and even-numbered (even) lands having a predetermined length and present in main data form one pair. For each pair of the adjacent odd-numbered and even-numbered lands having a predetermined length, a case where a mark is recorded on the odd-numbered land is defined as a code "0", and a case where a mark is recorded on the even-numbered land is defined as "1".

FIG. 29 shows an example where a mark is recorded on a 5T land as a land having a predetermined length. There is described here a case where a mark is formed on a land having a predetermined length. However, a mark may be formed on a pit having a predetermined length.

In this case, one address unit is assigned as a section for recording a one-bit code forming auxiliary data.

A mark is recorded as shown in the figure, so that an identical code is expressed for each pair of adjacent odd-numbered and even-numbered lands having a predetermined length in one address unit. Specifically, when a code "0" is recorded, a mark is recorded only on an odd-numbered land having a predetermined length in one address unit, as shown in the figure.

When a code "1" is recorded, a mark is recorded only on an even-numbered land having a predetermined length in one address unit.

During reproduction, the reproduction signal RF is sampled for each pair of adjacent odd-numbered and even-numbered lands having a predetermined length in one address unit, and a value of the reproduction signal RF sampled in the even-numbered land is subtracted from a value of the reproduction signal RF sampled in the odd-numbered land ("odd-even").

Here, there will be discussed an example where a reproduction signal level of a recorded mark is higher than a reproduction signal level in a part on which a mark is not recorded. In the case of a code "0" where a mark is recorded only in an odd-numbered land, when such an "odd-even" operation is performed, a positive value is obtained for each pair of adjacent lands having a predetermined length, ideally. That is, when integrating "odd-even" values obtained by an operation for each pair of adjacent lands having a predetermined length in this manner, a positive value may be obtained surely and detected. On the contrary, in the case of a code "1" where a mark is recorded only in an even-numbered land, an "odd-even" value obtained by an operation for each pair of adjacent lands having a predetermined length is ideally a negative value. Accordingly, when such values are integrated, a negative value may be obtained surely and detected.

In the optical disk 100, a reproduction signal level is increased in a part on which a mark is formed. Therefore, actually, a negative value is detected when a mark is recorded only in an odd-numbered land, and a positive value is detected when a mark is recorded only in an even-numbered land.

Here, as described above, an identical recording pattern is repeatedly recorded within a specific section, and one value is determined based on the plurality of identical recording patterns during reproduction. Therefore, a change in reflectance provided by mark recording may be only slight. Since a change in reflectance caused by mark recording may be slight as described above, a recorded mark may be prevented from affecting binarization of main data.

A mark is recorded by the same method as described above for other codes forming auxiliary data.

That is, in this case, auxiliary data is recorded for address units as many as codes forming the auxiliary data.

A section in which auxiliary data is recorded in this manner (hereinafter also referred to as auxiliary data recording section) is previously determined between the auxiliary data recording device 50 and a reproduction device. Accordingly, the auxiliary data recording device 50 is configured so that the aforementioned mark recording is performed on a plurality of address units as such an auxiliary data recording section previously determined.

Here, in the aforementioned recording method, it should be noted that when a mark is recorded on an edge of a land having a predetermined length, binarization of main data may not be appropriately performed. Specifically, when a mark is recorded on an edge of a land having a predetermined length as described above, a wrong land length (or pit length) may be detected in binarization, because a reflectance tends to be higher in a part on which a mark is recorded.

Therefore, a mark is recorded in a center of a target land for recording. According to this, since the resulting edge may be obtained as usual, binarization is not affected.

Figure 28:
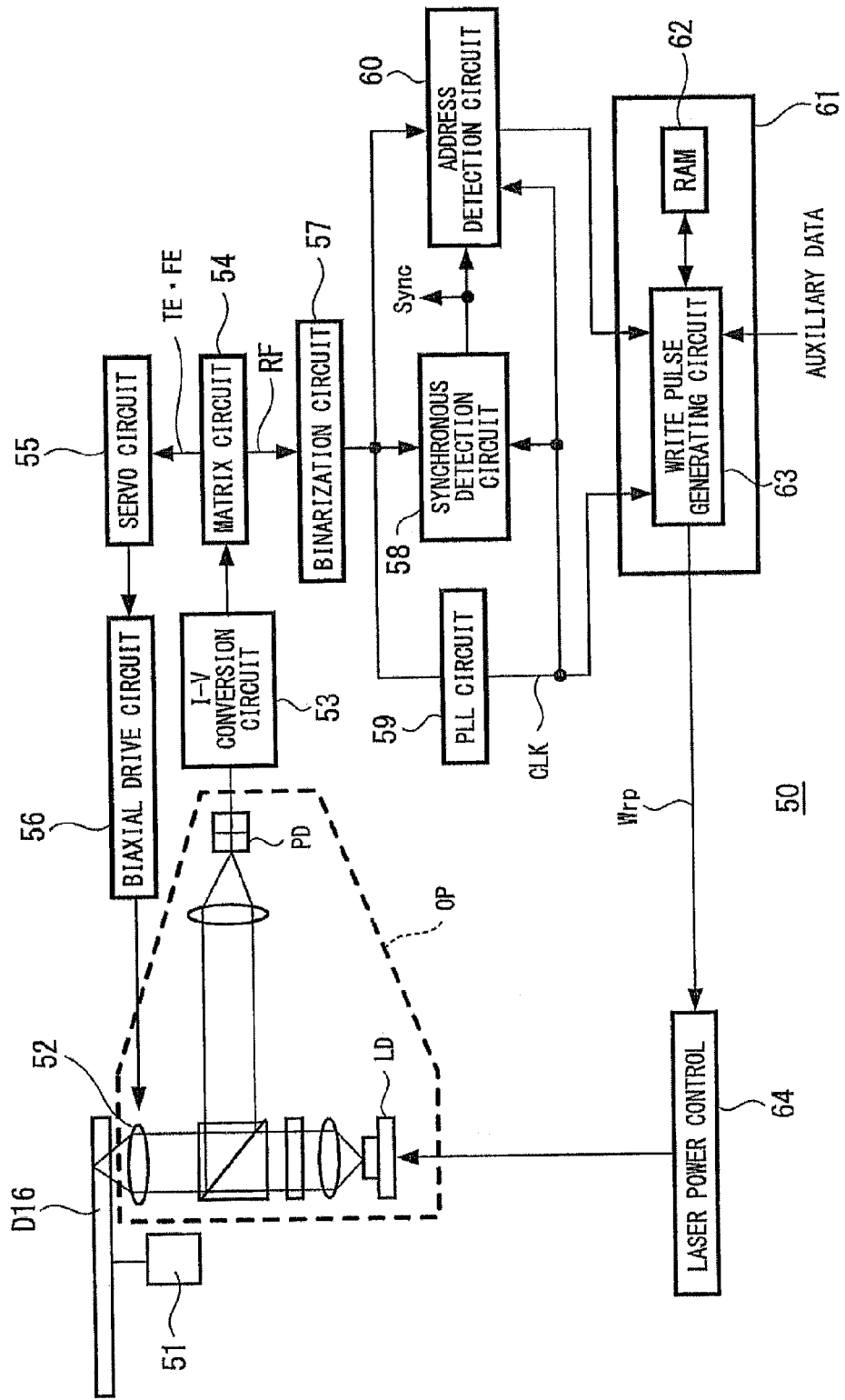
FIG. 28 is a configuration diagram of an example of an auxiliary data recording device using the optical recording medium having a write once metal reflective film according to the embodiment.

In order to allow the aforementioned recording to be performed, the write pulse generating circuit 63 in the auxiliary data generating circuit 61 shown in FIG. 28 generates the write pulse signal Wrp at a timing shown in FIG. 29. Specifically, the write pulse signal Wrp is generated corresponding to a code "0" to be at an H level only in a center of an odd-numbered land having a predetermined length. The write pulse signal Wrp is generated corresponding to a code "1" to be at an H level only in a center of an even-numbered land having a predetermined length.

Next, there will be described an example of a reproduction device performing reproduction on the optical disk 100 on which auxiliary data is recorded with a mark formed on the reflective film 102.

(Reproduction Device)

Figure 30:
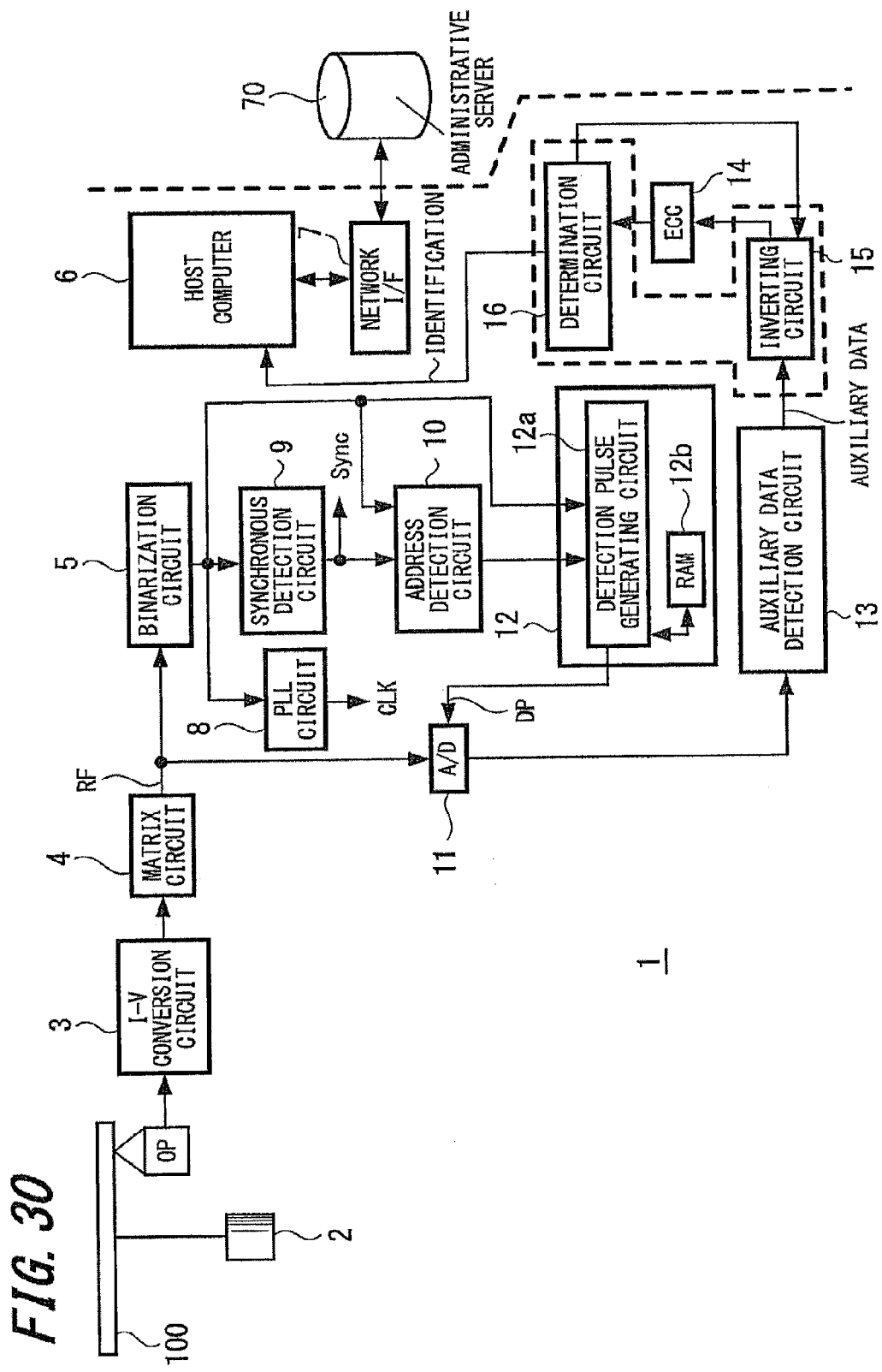
FIG. 30 is a configuration diagram of an example of an auxiliary data reproduction device using the optical recording medium having a write once metal reflective film according to the embodiment.

FIG. 30 is a block diagram showing a configuration of a reproduction device 1.

FIG. 30 shows mainly a part used for reproduction of auxiliary data and omits a configuration of a demodulation system in a stage subsequent to binarization in a configuration of a main data reproduction system, in particular. Description of an inverting circuit 15 and a determination circuit 16 is also omitted.

In the reproduction device 1, the optical disk 100 mounted on a turntable (not shown) is rotationally driven by a spindle motor 2 according to a predetermined rotational driving system. Also in this case, an optical pickup OP shown in the figure reads a recording signal (main data) from the optical disk 100 rotationally driven in this manner.

The optical pickup OP in this case also includes a laser diode forming a laser light source; an objective lens for focusing and applying laser light onto a recording surface of the optical disk 100; a biaxial mechanism holding the objective lens to be displaceable in a tracking direction and a focusing direction; a photodetector detecting light reflected from the optical disk 100 after the laser light irradiation, although they are omitted in the figure.

In the reproduction device 1, the optical disk 100 is irradiated with laser light having reproduction power.

Reflected light information detected by the photodetector in the optical pickup OP is converted to an electric signal in an I-V conversion circuit 3 and then supplied to a matrix circuit 4. The matrix circuit 4 generates a reproduction signal RF based on the reflected light information received from the I-V conversion circuit 3.

The matrix circuit 4 also generates a tracking error signal TE and a focus error signal FE, although they are not shown in the figure. They are supplied to a servo circuit (not shown) and are used for tracking servo control and focus servo control, respectively.

The reproduction signal RF generated in the matrix circuit 4 is supplied to a binarization circuit 5 and is also branched and supplied to a later-described A/D converter 11. The binarization circuit 5 converts the supplied reproduction signal RF to "0"/"1" binary data.

The binary data is supplied to a PLL circuit 8, a synchronous detection circuit 9 and an address detection circuit 10.

The binary data is also supplied to a detection pulse generating circuit 12a in a later-described detection pulse generating part 12.

The PLL circuit 8 generates a clock CLK synchronous with the supplied binary data and supplies it as a necessary operating clock for each part. In particular, the clock CLK in this case is also supplied to the detection pulse generating circuit 12a (not shown).

The synchronous detection circuit 9 detects a sync part inserted into each frame shown in FIG. 3 above from the supplied binary data. Specifically, the circuit detects a 9T section that is a sync pattern in this case to perform frame synchronization detection.

A frame synchronization signal is supplied to each part that needs the signal such as the address detection circuit 10.

The address detection circuit 10 detects address information from the supplied binary data based on the frame synchronization signal. The detected address information is supplied to a controller (not shown) totally controlling the reproduction device 1 and used for seeking or the like. The address information is also supplied to the detection pulse generating circuit 12a in the detection pulse generating part 12.

It should be confirmed that the optical pickup OP, the I-V conversion circuit 3, the matrix circuit 4, the binarization circuit 5, the PLL circuit 8, the synchronous detection circuit 9 and the address detection circuit 10 are parts also used when main data recorded on the optical disk 100 is reproduced. In other words, in these parts, a configuration of a main data reproduction system is also used for reproduction of auxiliary data.

The detection pulse generating part 12 generates a detection pulse Dp indicating a detection point according to a mark recording method determined to be common to that in the above auxiliary data recording device 50 for reproduction of identification as auxiliary data.

The detection pulse generating part 12 includes the detection pulse generating circuit 12a and a RAM 12b. The detection pulse generating circuit 12a generates the detection pulse Dp based on information stored in the RAM 12b. The generated detection pulse Dp is supplied to the A/D converter 11.

The reproduction signal RF from the matrix circuit 4 is supplied to the A/D converter 11. The A/D converter 11 samples the supplied reproduction signal RF at a timing indicated by the detection pulse signal Dp and supplies the value to an auxiliary data detection circuit 13. The auxiliary data detection circuit 13 performs a predetermined operation on the value supplied from the A/D converter 11 to detect each value of auxiliary data. Specifically, in this case, each value of auxiliary data is detected based on a result of performing an operation corresponding to the aforementioned "odd-even", for example.

The value of auxiliary data detected in the auxiliary data detection circuit 13 is supplied to an ECC (Error Correcting Code) circuit 14.

Auxiliary data in this case contains an identification and an error correcting code. The ECC circuit 14 performs error correction based on the error correcting code in the auxiliary data to reproduce the identification.

The reproduced identification is supplied to a host computer 6 shown in the figure.

The host computer 6 transmits a command to a controller (not shown) totally controlling the reproduction device 1 to direct various operations. For example, a command directing reproduction of main data recorded on the optical disk 100 is transmitted. Accordingly, main data reproduced from the optical disk 100 is binarized in the binarization circuit 5 and then demodulated (RLL1-7PP demodulation) in a demodulation system (not shown) or subjected to error correction, and is supplied to the host computer 6.

A network interface 7 is provided for the host computer 6 to perform data communication through a required network. This makes it possible to perform data communication between the host computer 6 and an external apparatus, in particular, an administrative server 70 shown in the figure through a predetermined network such as Internet.

Detection of a value of auxiliary data performed in the reproduction device 1 having the aforementioned configuration will be described with reference to the following FIG. 20.

Figure 31:
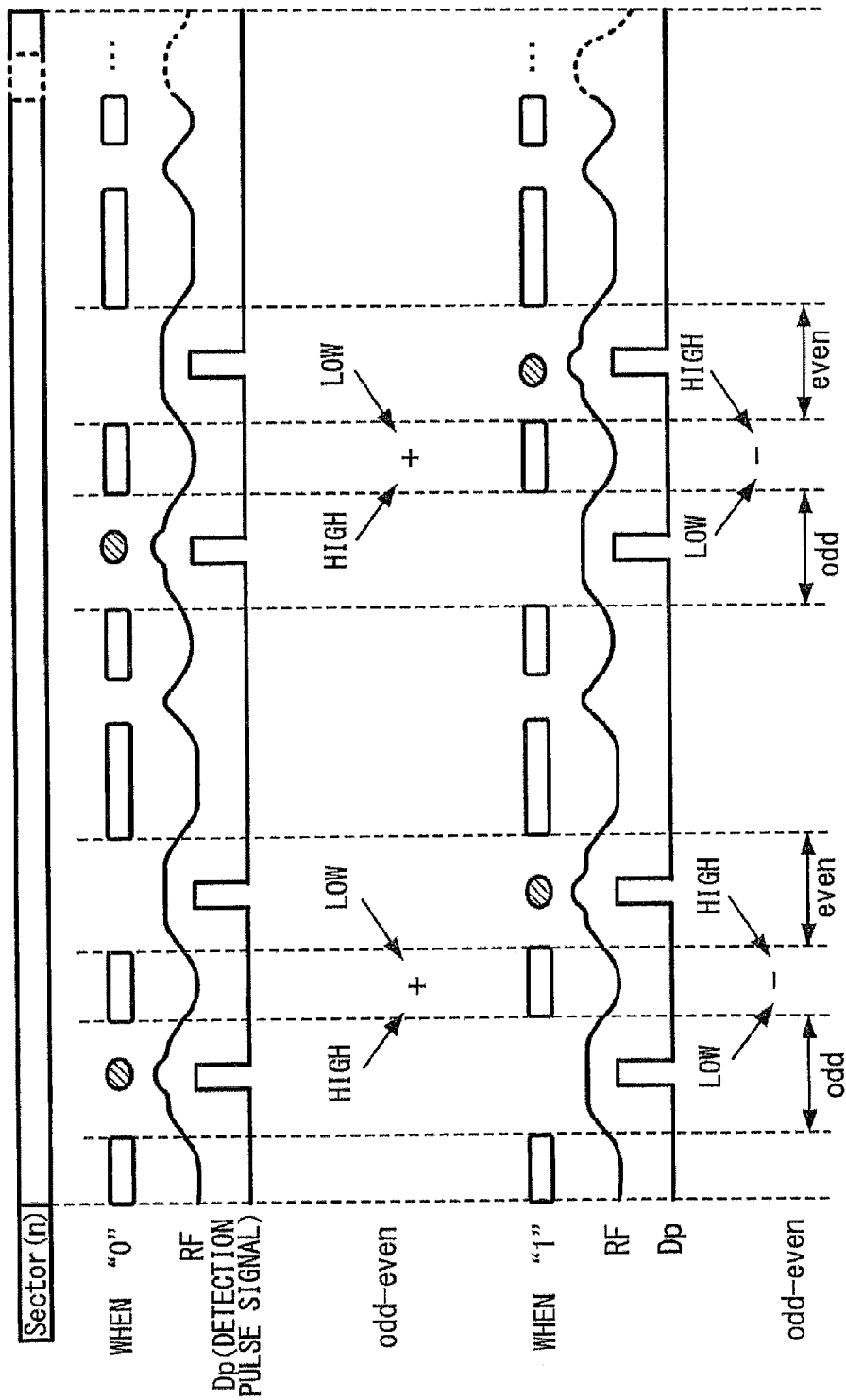
FIG. 31 is a view describing reproduction of auxiliary data from the optical recording medium having a write once metal reflective film according to the embodiment.

FIG. 31 shows a mark recording state in a case where "0" and "1" are assigned to one address unit on the optical disk 100 as a one-bit value of auxiliary data, respectively. For illustration, this figure shows a case where pits and lands as main data are formed in an identical pattern.

First, as described above, auxiliary data is recorded by assigning one-bit information to each address unit in a predetermined auxiliary data recording section on the optical disk 100.

In a code expression method in this case, a case where a mark is recorded on an odd-numbered land having a predetermined length is defined as "0", and a case where a mark is recorded on an even-numbered land having a predetermined length is defined as "1". In other words, when a code is "0" as shown in the figure, a mark is recorded only on an odd-numbered land having a predetermined length in the address unit. When a code is "1", a mark is recorded only on an even-numbered land having a predetermined length in the address unit.

Here, a part on which a mark is formed is a part on which a reflectance is slightly increased, for example. Therefore, as shown in the figure, a level of waveform of the reproduction signal RF is increased in a part on which a mark is recorded.

In reproduction of auxiliary data, each value is determined based on such a slight increase in reflectance in a part on which a mark is recorded.

As described above, when auxiliary data is recorded, each mark is recorded in a center of a land having a predetermined length. By recording a mark in a center of a land in this manner, as is clear from a waveform of the reproduction signal RF shown in the figure, a level is increased only in the center of the land on which the mark is recorded, and an edge waveform is obtained as usual. Accordingly, as described above, binarization of main data may be prevented from being affected.

Here, according to the above description, when a code is "0", a value of the reproduction signal RF is slightly increased only in an odd-numbered land having a predetermined length. When a code is "1", a value of the reproduction signal RF is slightly increased only in an even-numbered land having a predetermined length.

Accordingly, in this case, in order to determine each value of auxiliary data assigned to each address unit, it is sufficient to detect which of an odd-numbered land and an even-numbered land having a predetermined length in the address unit has a value of the reproduction signal RF increased.

An increase in value of the reproduction signal RF in a part on which a mark is recorded may be detected by determining a difference from a value of the reproduction signal RF in a part on which a mark is not recorded, for example.

In this case, a mark is recorded only on an odd-numbered land when a code is "0", and a mark is recorded only on an even-numbered land when a code is "1" as described above. In other words, an even-numbered land necessarily forms a part on which a mark is not recorded when a code is "0", and an odd-numbered land necessarily forms a part on which a mark is not recorded when a code is "1".

Accordingly, when an "odd-even" operation is performed on adjacent odd-numbered (odd) and even-numbered (even) lands, it is possible to examine which of odd and even has a value of the reproduction signal RF increased (has a mark recorded).

Specifically, when the "odd-even" is a positive value, a value of the reproduction signal RF is increased in an odd-numbered land, and therefore it is found that a mark is recorded on an odd-numbered land. On the contrary, when the "odd-even" is a negative value, a value of the reproduction signal is increased in an even-numbered land, and therefore it is found that a mark is recorded on an even-numbered land.

However, a noise component is actually superimposed on the reproduction signal RF. In a part on which a mark is recorded, the reproduction signal RF is decreased in value only slightly and may be submerged in such a noise component. Accordingly, if the "odd-even" detection is performed only for one pair of adjacent even-numbered lands having a predetermined length, it is difficult to surely determine a value.

Therefore, with regard to reproduction of auxiliary data, "odd-even" values calculated for each pair of adjacent odd-numbered and even-numbered lands as described above are integrated, and a one-bit value assigned to the address unit is determined based on the integrated value. This makes it possible to detect a value of auxiliary data more surely.

For the aforementioned "odd-even" calculation, it is necessary to sample values of the reproduction signal RF obtained in centers of both of odd and even, that is, odd-numbered and even-numbered lands having a predetermined length. The detection pulse generating part 12 shown in FIG. 30 generates the detection pulse signal Dp as a signal for indicating a sampling timing for the "odd-even" calculation.

Here, as is clear from FIG. 30, a signal having an H level only in a center of a land having a predetermined length obtained in main data may be generated to be sufficient as the detection pulse Dp for the aforementioned "odd-even" calculation.

For generation of such a detection pulse Dp, it is sufficient to generate a corresponding timing from a content of main data recorded in an auxiliary data recording section on the optical disk 100, as in the case of generation of the write pulse signal Wrp for the aforementioned auxiliary data recording device 50.

However, since the reproduction device 1 is not used for the manufacture of an optical disk unlike the auxiliary data recording device 50, a content recorded on the optical disk 100 may not be previously stored in the device. Accordingly, the reproduction device 1 reads main data in an auxiliary data recording section from the mounted optical disk 100, and the main data is stored in the device and used for generating the detection pulse signal Dp.

The reproduction device 1 includes the RAM 12b in a detection pulse generating part 12 shown in FIG. 30 as a memory for storing main data in an auxiliary data recording section read in this manner. Main data having data structure as shown in FIG. 32 read corresponding to each address is stored.

In the detection pulse generating circuit 12a in the detection pulse generating part 12, a data sequence indicating "1" only at corresponding timings and indicating "0" at all other timings is generated based on a content of main data in a recording section stored in the RAM 12b in this manner, as in the aforementioned generation of the write pulse signal Wrp. The detection pulse Dp based on a data sequence generated in this manner is generated and supplied to the A/D converter 11. A value of the reproduction signal RF may be sampled at an appropriate timing shown in FIG. 31 by sampling a value of the reproduction signal RF using the A/D converter 11 at a timing indicated by the detection pulse signal Dp.

As described above, according to the optical recording medium according to the embodiment when a composition of its reflective film is selected, an optical recording medium may be surely obtained in which reproduction may be performed in a part of the reflective film on which auxiliary data is recorded at a reproduction level higher than in a part on which auxiliary data is not recorded.

Therefore, according to the optical recording medium according to the embodiment, as initially described with reference to FIG. 33, reading of auxiliary data may be substantially unable, when a pirated disk is prepared by separating a cover layer and a reflective film from the optical recording medium and transferring, from a substrate 101 having a dent caused by thermal deformation occurring in formation of an auxiliary data mark, an irregularity on a surface of the substrate including the dent caused by the auxiliary data mark.

Specifically, since a reproduction level in a recorded mark formed with a dent shown in FIG. 33B is decreased from that in a part on which a mark is not recorded, it is impossible to obtain a pirated disk having normal auxiliary data in which a reproduction level is increased in auxiliary data as in the aforementioned optical recording medium according to the embodiment. Alternatively, a pirated copy may be immediately determined.

As described above, the optical recording medium having a write once metal reflective film according to the embodiment may cause inversion of polarity of a reproduction signal in a pirated copy by illegal copying. Therefore, it is possible to determine a pirated optical recording medium and furthermore to make it unable to reproduce in a pirated optical recording medium, for example, and violation of copyrights may be effectively prevented.

As described above, the optical recording medium having a write once metal reflective film according to the embodiment employs an Ag alloy film in which hillock generation is suppressed and which has excellent weatherability. Therefore, long-term data storage reliability may be significantly improved.

Conventionally, metal alloy reflective films having various elements added to an Ag alloy have been proposed as reflective films in optical recording media. The embodiment may provide an optical recording medium, in which polarity of a reproduction signal may be significantly inverted in a pirated copy by illegal copying in reproduction of write once recorded auxiliary data, and which has a write once metal reflective film having excellent long-term storage reliability and excellent weatherability.

In the above description, an optical disk is mainly mentioned. However, a substrate shape and the like are not limited.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An optical recording medium comprising:
a substrate including pits and lands configured to store main data;
a write once metal reflective film including a laser irradiation mark configured to store auxiliary data; and
a cover layer stacked and formed on the substrate, wherein
a first part on which the laser irradiation mark is formed in the lands having a predetermined length and structured to provide a first reproduction signal level which is increased,
the write once metal reflective film is formed of an Ag alloy film of $Ag_{100-x-y}X_xCu_y$ (x, y: at %),
the X is at least one element selected from the group consisting of Ti, W, Ta, V, Mo, Nb and Zr, and
a composition y of Cu in the Ag alloy film is selected to be $2 \leq y \leq 13$ [at %].

2. The optical recording medium of claim 1, wherein:
(a) the X is Ti, and
(b) a composition x of Ti in the Ag alloy film is selected to be $4.5 \leq x \leq 17$ [at %].

3. The optical recording medium of claim 1, wherein:
(a) the X is W, and
(b) a composition x of W in the Ag alloy film is selected to be $2.5 \leq x \leq 11$ [at %].

4. The optical recording medium of claim 1, wherein:
(a) the X is Ta, and
(b) a composition x of Ta in the Ag alloy film is selected to be $0.6 \leq x \leq 10.5$ [at %].

5. The optical recording medium of claim 1, wherein:
(a) the X is at least two elements selected from the group consisting of Ti, W, Ta, V, Mo, Nb and Zr, and
(b) a total composition x of the X in the Ag alloy film is selected to be $0.6 \leq x \leq 17$ [at %].

6. The optical recording medium of claim 1, wherein the laser irradiation mark is formed on an optical disk recording medium prepared by physically transferring a surface shape of the pits and lands of the substrate so that the laser irradiation mark is structured to provide a second reproduction signal level which is decreased.

* * * * *

UNITED STATES PATENT AND TRADEMARK OFFICE
CERTIFICATE OF CORRECTION

PATENT NO. : 8,187,689 B2
APPLICATION NO. : 12/303408
DATED : May 29, 2012
INVENTOR(S) : Sakamoto et al.

Page 1 of 1

It is certified that error appears in the above-identified patent and that said Letters Patent is hereby corrected as shown below:

On the face of the patent, Item 75, in the "Inventors" section, please replace "Tetsuhiro Sakamoto, Tokyo (JP);" with --Tetsuhiro Sakamoto, Kanagawa (JP);--.

On the face of the patent, Item 75, in the "Inventors" section, please replace "Naoki Okawa, Tokyo (JP);" with --Naoki Okawa, Shizuoka (JP);--.

Signed and Sealed this
Ninth Day of October, 2012

David J. Kappos
*Director of the United States Patent and Trademark Office*